(12) United States Patent
Peters et al.

(10) Patent No.: US 8,373,012 B2
(45) Date of Patent: Feb. 12, 2013

(54) RENEWABLE JET FUEL BLENDSTOCK FROM ISOBUTANOL

(75) Inventors: Matthew W. Peters, Highlands Ranch, CO (US); Joshua D. Taylor, Evergreen, CO (US)

(73) Assignee: Gevo, Inc., Englewood, CO (US)

( * ) Notice: Subject to any disclaimer, the term of this patent is extended or adjusted under 35 U.S.C. 154(b) by 0 days.

(21) Appl. No.: 13/103,812

(22) Filed: May 9, 2011

(65) Prior Publication Data

US 2011/0288352 A1 Nov. 24, 2011

Related U.S. Application Data

(60) Provisional application No. 61/332,561, filed on May 7, 2010.

(51) Int. Cl.
*C07C 1/24* (2006.01)
*C07C 5/03* (2006.01)
*C07C 2/06* (2006.01)

(52) U.S. Cl. .......... 585/310; 585/14; 585/240; 585/254; 585/324; 585/640

(58) Field of Classification Search .................... 585/14, 585/240, 254, 303, 310, 324, 640, 643, 647; 44/385, 398, 403, 437
See application file for complete search history.

(56) References Cited

U.S. PATENT DOCUMENTS

| | | |
|---|---|---|
| 2,391,188 A | 12/1945 | Patterson |
| 2,391,646 A | 12/1945 | Schulze et al. |
| 2,529,061 A | 11/1950 | Vergnaud |
| 2,554,054 A | 5/1951 | Owen |
| 2,813,119 A | 11/1957 | Taves |
| 2,894,978 A | 7/1959 | Katzschmann |
| 2,945,900 A | 7/1960 | Alexander et al. |
| 2,982,795 A | 5/1961 | Owen |
| 2,984,644 A | 5/1961 | Wheat |
| 3,002,035 A | 9/1961 | Hieronymus |
| 3,154,593 A | 10/1964 | Long |
| 3,301,906 A | 1/1967 | Besozzi et al. |
| 3,344,037 A | 9/1967 | Leavitt |
| 3,356,754 A | 12/1967 | Wofford |
| 3,445,521 A | 5/1969 | Callahan et al. |
| 3,509,237 A | 4/1970 | Aubrey |
| 3,513,193 A | 5/1970 | Katzschmann |
| 3,644,550 A | 2/1972 | Beuther et al. |
| 3,662,016 A | 5/1972 | Furuoya et al. |
| 3,686,341 A | 8/1972 | Eberly |
| 3,755,458 A | 8/1973 | Vrbaski et al. |
| 3,825,502 A | 7/1974 | Takenaka et al. |
| 3,827,968 A | 8/1974 | Givens et al. |
| 3,830,866 A | 8/1974 | D'Alessandro et al. |
| 3,832,418 A | 8/1974 | Bercik et al. |
| 3,836,603 A | 9/1974 | Connor, Jr. et al. |
| 3,850,981 A | 11/1974 | Trebellas et al. |
| 3,851,008 A | 11/1974 | Stowe et al. |
| 3,886,224 A | 5/1975 | Mitchell, Jr. |
| 3,887,612 A | 6/1975 | Shigeyasu et al. |
| 3,891,721 A | 6/1975 | Prudence |
| 3,959,400 A | 5/1976 | Lucki |
| 3,960,978 A | 6/1976 | Givens et al. |
| 3,997,621 A | 12/1976 | Brennan |
| 4,025,575 A | 5/1977 | Chang et al. |
| 4,096,340 A | 6/1978 | Fujii et al. |
| 4,100,220 A | 7/1978 | Bowman et al. |
| 4,112,011 A | 9/1978 | Kolombos |
| 4,129,600 A | 12/1978 | Childress et al. |
| 4,152,300 A | 5/1979 | Riesser |
| 4,190,608 A | 2/1980 | Grasselli et al. |
| 4,197,185 A | 4/1980 | Le Page et al. |
| 4,225,743 A | 9/1980 | Hoshiyama et al. |
| 4,229,320 A | 10/1980 | Slaugh |
| 4,229,603 A | 10/1980 | Lyon |
| 4,241,220 A | 12/1980 | Itaya et al. |
| 4,244,806 A | 1/1981 | Le Page et al. |
| 4,266,958 A | 5/1981 | Cummings |
| 4,293,722 A | 10/1981 | Ward et al. |
| 4,304,948 A | 12/1981 | Vora et al. |
| 4,324,646 A | 4/1982 | Le Page et al. |
| 4,329,493 A | 5/1982 | Hashizume et al. |
| 4,331,823 A | 5/1982 | Wieder et al. |
| 4,342,876 A | 8/1982 | Klingman |
| 4,354,044 A | 10/1982 | Aoshima et al. |
| 4,385,157 A | 5/1983 | Auclair et al. |

(Continued)

FOREIGN PATENT DOCUMENTS

| | | |
|---|---|---|
| GB | 1313083 | 4/1973 |
| JP | 10-237017 A | 9/1998 |

(Continued)

OTHER PUBLICATIONS

Young, "International Search Report," 2 pages, International Patent Appl. No. PCT/US11/35769, United States Patent and Trademark Office (Aug. 17, 2011).

(Continued)

*Primary Examiner* — Thuan D Dang
(74) *Attorney, Agent, or Firm* — Cooley LLP

(57) ABSTRACT

The present invention in its various embodiments is directed to methods for preparing a renewable jet fuel blendstock, and blendstocks prepared by such methods, comprising fermenting a biomass-derived feedstock to form one or more $C_2$-$C_6$ alcohols such as isobutanol, catalytically dehydrate and oligomerize the alcohols to form higher molecular weight olefins (e.g., $C_8$-$C_{16}$ olefins), hydrogenating at least a portion of the higher molecular weight olefins to form a renewable jet fuel blendstock comprising $C_{12}$ and $C_{16}$ alkanes which meet or exceed the requirements of ASTM D7566-10a for hydroprocessed synthesized paraffinic kerosene (SPK).

15 Claims, 6 Drawing Sheets

U.S. PATENT DOCUMENTS

| | | |
|---|---|---|
| 4,393,259 A | 7/1983 | Ward et al. |
| 4,396,787 A | 8/1983 | Gluzek et al. |
| 4,398,920 A | 8/1983 | Guibet et al. |
| 4,423,267 A | 12/1983 | Dowling et al. |
| 4,448,643 A | 5/1984 | Lindner et al. |
| 4,456,779 A | 6/1984 | Owen et al. |
| 4,456,781 A | 6/1984 | Marsh et al. |
| 4,463,211 A | 7/1984 | Manning |
| 4,465,884 A | 8/1984 | Degnan et al. |
| 4,471,147 A | 9/1984 | Owen et al. |
| 4,499,316 A | 2/1985 | Garska et al. |
| 4,504,692 A | 3/1985 | Arakawa et al. |
| 4,504,693 A | 3/1985 | Tabak et al. |
| 4,518,796 A | 5/1985 | Aoshima et al. |
| 4,531,014 A | 7/1985 | Gregory et al. |
| 4,542,251 A | 9/1985 | Miller |
| 4,544,792 A | 10/1985 | Smith et al. |
| 4,612,406 A | 9/1986 | Long et al. |
| 4,621,164 A | 11/1986 | Chang et al. |
| 4,642,369 A | 2/1987 | Modic et al. |
| 4,663,406 A | 5/1987 | Bronstert et al. |
| 4,698,452 A | 10/1987 | Le Van Mao et al. |
| 4,720,600 A | 1/1988 | Beech, Jr. et al. |
| 4,720,601 A | 1/1988 | Suzukamo et al. |
| 4,740,652 A | 4/1988 | Frame |
| 4,788,376 A | 11/1988 | Mazurek et al. |
| 4,806,701 A | 2/1989 | Shum |
| 4,808,763 A | 2/1989 | Shum |
| 4,855,528 A | 8/1989 | Young et al. |
| 4,864,068 A | 9/1989 | Shamshoum |
| 4,873,392 A | 10/1989 | Le Van Mao |
| 4,908,471 A | 3/1990 | Leuck et al. |
| 4,950,828 A | 8/1990 | Shum |
| 4,975,402 A | 12/1990 | le van Mao et al. |
| 5,026,938 A | 6/1991 | Shum |
| 5,087,789 A | 2/1992 | McDaniel et al. |
| 5,107,050 A | 4/1992 | Gaffney et al. |
| 5,130,458 A | 7/1992 | Wu |
| 5,135,861 A | 8/1992 | Pavilon |
| 5,386,071 A | 1/1995 | Kuchar et al. |
| 5,414,160 A | 5/1995 | Sato et al. |
| 5,519,101 A | 5/1996 | Nubel et al. |
| 5,550,306 A | 8/1996 | Chauvin et al. |
| 5,625,109 A | 4/1997 | Gupta |
| 5,672,800 A | 9/1997 | Mathys et al. |
| 5,693,793 A | 12/1997 | Ritz et al. |
| 5,753,474 A | 5/1998 | Ramey |
| 5,801,286 A | 9/1998 | Besson et al. |
| 5,856,604 A | 1/1999 | Stine et al. |
| 5,877,372 A | 3/1999 | Evans et al. |
| 5,895,830 A | 4/1999 | Stine et al. |
| 5,962,604 A | 10/1999 | Rath |
| 5,969,178 A | 10/1999 | Okamoto et al. |
| 5,990,367 A | 11/1999 | Stine et al. |
| 5,994,601 A | 11/1999 | Nierlich et al. |
| 6,111,160 A | 8/2000 | Powers et al. |
| 6,143,942 A | 11/2000 | Verrelst et al. |
| 6,239,321 B1 | 5/2001 | Mossman et al. |
| 6,300,536 B1 | 10/2001 | Verrelst et al. |
| 6,323,384 B1 | 11/2001 | Powers et al. |
| 6,331,580 B1 | 12/2001 | Molnar |
| 6,358,717 B1 | 3/2002 | Blaschek et al. |
| 6,376,731 B1 | 4/2002 | Evans et al. |
| 6,600,081 B2 | 7/2003 | Manzer et al. |
| 6,649,757 B2 | 11/2003 | Kuroda et al. |
| 6,660,898 B1 | 12/2003 | Pyhälahti et al. |
| 6,689,927 B1 | 2/2004 | Frame et al. |
| 6,770,791 B2 | 8/2004 | Mathys et al. |
| 6,875,899 B2 | 4/2005 | Martens et al. |
| 6,884,916 B1 | 4/2005 | Brown et al. |
| 7,002,053 B2 | 2/2006 | Nierlich et al. |
| 7,012,167 B2 | 3/2006 | Kahn |
| 7,038,101 B2 | 5/2006 | Nurminen et al. |
| 7,067,708 B2 | 6/2006 | Manzer et al. |
| 7,161,053 B2 | 1/2007 | Beckmann et al. |
| 7,169,588 B2 | 1/2007 | Burch et al. |
| 7,183,450 B2 | 2/2007 | Brown et al. |
| 7,238,844 B2 | 7/2007 | Mathys et al. |
| 7,271,304 B2 | 9/2007 | Du Toit |
| 7,304,196 B2 | 12/2007 | Purola et al. |
| 7,329,788 B2 | 2/2008 | Tiitta et al. |
| 7,345,212 B2 | 3/2008 | Beadle et al. |
| 7,439,409 B1 | 10/2008 | Jan et al. |
| 7,498,473 B2 | 3/2009 | Zhou et al. |
| 7,553,997 B2 | 6/2009 | Stark et al. |
| 7,682,811 B2 | 3/2010 | Leschine et al. |
| 7,833,778 B2 | 11/2010 | Butler, III |
| 8,193,402 B2 | 6/2012 | Gruber et al. |
| 2002/0183578 A1 | 12/2002 | Commereuc et al. |
| 2003/0055179 A1 | 3/2003 | Ota et al. |
| 2004/0044261 A1 | 3/2004 | Feng et al. |
| 2005/0069998 A1 | 3/2005 | Ballesteros Perdices et al. |
| 2005/0112739 A1 | 5/2005 | Golubkov |
| 2005/0176870 A1 | 8/2005 | Kulkarni et al. |
| 2005/0183325 A1 | 8/2005 | Sutkowski |
| 2005/0228203 A1 | 10/2005 | Manzer |
| 2005/0228204 A1 | 10/2005 | Manzer |
| 2006/0111599 A1 | 5/2006 | Lamprecht et al. |
| 2007/0039239 A1 | 2/2007 | Forester et al. |
| 2007/0092957 A1 | 4/2007 | Donaldson et al. |
| 2007/0135665 A1 | 6/2007 | Wiese et al. |
| 2007/0148751 A1 | 6/2007 | Griffin et al. |
| 2007/0191662 A1 | 8/2007 | Oikarinen et al. |
| 2007/0202062 A1 | 8/2007 | Workman et al. |
| 2007/0215519 A1 | 9/2007 | Dierickx |
| 2007/0259410 A1 | 11/2007 | Donaldson et al. |
| 2007/0259411 A1 | 11/2007 | Bramucci et al. |
| 2007/0264697 A1 | 11/2007 | Taguchi et al. |
| 2007/0292927 A1 | 12/2007 | Donaldson et al. |
| 2008/0009656 A1 | 1/2008 | D'Amore et al. |
| 2008/0015395 A1* | 1/2008 | D'amore et al. ............. 568/697 |
| 2008/0015397 A1 | 1/2008 | D'Amore et al. |
| 2008/0045754 A1 | 2/2008 | D'Amore et al. |
| 2008/0057555 A1 | 3/2008 | Nguyen |
| 2008/0124774 A1 | 5/2008 | Bramucci et al. |
| 2008/0131948 A1 | 6/2008 | Manzer et al. |
| 2008/0132730 A1 | 6/2008 | Manzer et al. |
| 2008/0132732 A1 | 6/2008 | Manzer et al. |
| 2008/0132741 A1 | 6/2008 | D'Amore et al. |
| 2008/0138870 A1 | 6/2008 | Bramucci et al. |
| 2008/0182308 A1 | 7/2008 | Donaldson et al. |
| 2008/0220488 A1 | 9/2008 | D'Amore et al. |
| 2008/0227940 A1 | 9/2008 | Wilson et al. |
| 2008/0234523 A1 | 9/2008 | Manzer et al. |
| 2008/0248540 A1 | 10/2008 | Yang |
| 2008/0261230 A1 | 10/2008 | Liao et al. |
| 2008/0274525 A1 | 11/2008 | Bramucci et al. |
| 2008/0312482 A1 | 12/2008 | Jan et al. |
| 2008/0312485 A1 | 12/2008 | Takai et al. |
| 2009/0030239 A1 | 1/2009 | D'Amore et al. |
| 2009/0061492 A1 | 3/2009 | Benning et al. |
| 2009/0068714 A1 | 3/2009 | Leschine et al. |
| 2009/0099401 A1 | 4/2009 | D'Amore et al. |
| 2009/0155869 A1 | 6/2009 | Buelter et al. |
| 2009/0171129 A1 | 7/2009 | Evanko et al. |
| 2009/0182163 A1 | 7/2009 | Foo et al. |
| 2009/0215137 A1 | 8/2009 | Hawkins et al. |
| 2009/0226990 A1 | 9/2009 | Hawkins et al. |
| 2009/0226991 A1 | 9/2009 | Feldman et al. |
| 2009/0239009 A1 | 9/2009 | Tanaka |
| 2009/0240068 A1 | 9/2009 | Rajendran |
| 2009/0247799 A1 | 10/2009 | Myllyoja et al. |
| 2009/0299109 A1 | 12/2009 | Gruber et al. |
| 2010/0108568 A1 | 5/2010 | De Klerk |
| 2010/0137647 A1 | 6/2010 | Bradin |
| 2010/0216958 A1 | 8/2010 | Peters et al. |
| 2011/0087000 A1 | 4/2011 | Peters et al. |
| 2011/0172475 A1 | 7/2011 | Peters et al. |
| 2011/0288311 A1 | 11/2011 | Frost et al. |
| 2012/0171741 A1 | 7/2012 | Peters et al. |
| 2012/0238787 A1 | 9/2012 | Gruber et al. |

FOREIGN PATENT DOCUMENTS

| | | |
|---|---|---|
| JP | 2001-2600 A | 1/2001 |
| JP | 2006-306731 A | 11/2006 |
| JP | 2007-61763 A | 3/2007 |
| WO | WO 03/053570 A1 | 7/2003 |

| | | |
|---|---|---|
| WO | WO 03/070671 A1 | 8/2003 |
| WO | WO 2005/065393 A2 | 7/2005 |
| WO | WO 2005/073172 A1 | 8/2005 |
| WO | WO 2005/092821 A1 | 10/2005 |
| WO | WO 2007/091862 A1 | 8/2007 |
| WO | WO 2008/058664 A1 | 5/2008 |
| WO | WO 2008/113492 A1 | 9/2008 |
| WO | WO 2009/038965 A1 | 3/2009 |
| WO | WO 2009/039000 A2 | 3/2009 |
| WO | WO 2009/039333 A1 | 3/2009 |
| WO | WO 2009/039335 A1 | 3/2009 |
| WO | WO 2009/039347 A1 | 3/2009 |

OTHER PUBLICATIONS

Young, "Written Opinion of the International Searching Authority," 5 pages, International Patent Appl. No. PCT/US11/35769, United States Patent and Trademark Office (Aug. 17, 2011).
Rumizen, "ASTM Aviation Synthetic Fuel Specification," 3$^{rd}$ International Conference on Biofuel Standards, World Biofuels Markets Congress, 19 pages (Mar. 2010).
U.S. Appl. No. 13/441,459, filed Apr. 6, 2012.
U.S. Appl. No. 13/441,468, filed Apr. 6, 2012.
U.S. Appl. No. 13/557,066, filed Jul. 24, 2012.
U.S. Appl. No. 12/711,919, filed Feb. 24, 2010.
U.S. Appl. No. 12/899,285, filed Oct. 6, 2010.
U.S. Appl. No. 12/986,918, filed Jan. 7, 2011.
"International Preliminary Report on Patentability," 10 pages, International Patent Appl. No. PCT/US2010/025234, United States Patent and Trademark Office (issued Aug. 30, 2011).
"International Search Report," 2 pages, from International Appl. No. PCT/US2010/051641, United States Patent and Trademark Office, Alexandria, Virginia, USA (mailed Dec. 2, 2010).
"International Search Report," 2 pages, from PCT Appl. No. PCT/US2011/020549, United States Patent and Trademark Office, Alexandria, Virginia, United States (mailed Mar. 11, 2011).
"International Search Report," 2 pages, International Patent Appl. No. PCT/US2011/058766, United States Patent and Trademark Office (Feb. 17, 2012).
"International Search Report," 4 pages, International Patent Application No. PCT/US2008/085423, United States Patent and Trademark Office, Alexandria, Virginia, United States (mailed Jul. 15, 2009).
"International Search Report," 5 pages, International Patent Appl. No. PCT/US2010/025234, United States Patent and Trademark Office (mailed Jun. 15, 2010).
"Part 2, Oxidative Dehydrodimerization of Alkenes", Catalysis Today, (1992), 343-393.
"Written Opinion of the International Searching Authority," 5 pages, International Patent Appl. No. PCT/US2011/058766, United States Patent and Trademark Office (Feb. 17, 2012).
"Written Opinion of the International Searching Authority," 6 pages, International Patent Application No. PCT/US2008/085423, United States Patent and Trademark Office, Alexandria, Virginia, United States (mailed Jul. 15, 2009).
"Written Opinion of the International Searching Authority," 7 pages, from International Appl. No. PCT/US10/51641, United States Patent and Trademark Office, Alexandria, Virginia, USA (mailed Dec. 2, 2010).
"Written Opinion of the International Searching Authority," 9 pages, International Patent Appl. No. PCT/US2010/025234, United States Patent and Trademark Office (mailed Jun. 15, 2010).
"Written Opinion of the International Searching Authority," 9 pages, from PCT Appl. No. PCT/US11/20549, United States Patent and Trademark Office, Alexandria, Virginia, United States (mailed Mar. 11, 2011).
Amin et al., "Dealuminated ZSM-5 Zeolite Catalyst for Ethylene Oligomerization to Liquid Fuels", Journal of Natural Gas Chemistry 2002, 11, 79-86.
Angermayr et al., "Energy Biotechnology with Cyanobacteria" Current Opinion in Biotechnology Jun. 2009, vol. 20, pp. 257-263.
ASTM International, "Standard Specification for Automotive Spark-Ignition Engine Fuel," Designation D4814-11, 31 pages (Jul. 2011).
ASTM International, "Standard Specification for Aviation Gasolines," Designation D910-11, 8 pages (May 2011).
ASTM International, "Standard Specification for Aviation Turbine Fuels," Designation D1655-11 a, 16 pages (Aug. 2011).
ASTM International, "Standard Specification for Diesel Fuel Oils," Designation D975-I1, 25 pages (Apr. 2011).
ASTM test method D 6866-05, "Determining the Biobased Content of Natural Range Materials Using Radiocarbon and Isotope Ratio Mass Spectrometry Analysis" 14 pages, 2005.
Atsumi "Direct photosynthetic recycling of carbon dioxide to isobutyraldehyde" Nature Biotechnology, Nov. 15, 2009, vol. 27, pp. 1177-1182.
Atsumi et al., "Non-fermentative Pathways for Synthesis of Branched-Chain Higher Alcohols as Biofuels", Nature, 2008, 451, p. 86-89.
Atsumi et al., Online Supplementary Information of "Non-fermentative Pathways for Synthesis of Branched-Chain Higher Alcohols as Biofuels", Nature, 2008, pp. 1-8.
Batist et al. "The catalytic oxidation of 1-butene over bismuth molybdate catalysts: II. Dependence of activity and selectivity on the catalyst composition" Journal of Catalysis, Feb. 1966, vol. 5, pp. 55-64.
Bekker and Prinsloo, "Butene Oligomerization over Phosphoric Acid: Structural Characterization of Products," Ind. Eng. Chem. Res. 48(22):10156-10162 (2009).
Bezergianni et al., "Catalytic Hydrocracking of Fresh and Used Cooking Oil," Ind. Eng. Chem. Res. 48:8402-8406 (2009).
Busca, "Acid Catalysts in Industrial Hydrocarbon Chemistry" Chemical Reviews, 2007, 107, 5366- 5410.
Buyanov et al. "Catalysts and Processes for Paraffin and Olefin Dehydrogenation," Kinetics and Catalysis, Jan. 2001, vol. 42, pp. 64-75.
Čejka et al., "Acid-Catalyzed Sythesis of Mono- and Dialkyl Benzenes over Zeolites: Active Sites, Zeolite Topology, and Reaction Mechanisms", Catalysis Review 2002, 44(3), 375-421.
Chen and Yan, "M2 Forming—A Process for Aromatization of Light Hydrocarbons", Ind. Eng. Chem. Process Des. Dev., 25 (1986), 151-155.
Connor et al. "Engineering of an *Escherichia coli* Strain for the Production of 3-Methyl-1-Butanol" Applied Envirionmental Microbiology, Sep. 2008, vol. 74, pp. 5769-5775.
de Klerk, "Can Fischer-Tropsch Syncrude Be Refined to On-Specification Diesel Fuel?" Energy Fuels 23:4593-4604 (2009).
de Klerk, "Distillate Production by Oligomerization of Fischer-Tropsch Olefins over Solid Phosphoric Acid," Energy Fuels 20:439-445 (2006).
de Klerk, "Fischer-Tropsch Refining," Title page and pp. i-xi, Ph.D. Thesis, University of Pretoria (Feb. 2008).
de Klerk, "Fischer-Tropsch refining: technology selection to match molecules," Green Chem. 10:1249-1279 (2008).
Delhomme et al. "Succinic acid from renewable resources as a C4 building-block chemical—a review of the catalytic possibilities in aqueous media" Green Chemistry, Jan. 2009, vol. 11(1), pp. 13-26.
Dexter et al. "Metabolic Engineering of Cyanobacteria for Ethanol Production" Energy & Environmental Science, Aug. 2009, vol. 2(8), pp. 857-864.
Dhaliwal et al. "Measurement of the Unsaturation of Butyl Rubbers by the Iodine Index Method" Rubber Chemistry and Technology, 1994, vol. 67, pp. 567-581.
Frame et al., "High Octane Gasoline from Field Butanes by the UOP Indirect Alkylation (InAlk) Process", Erdöl, Erdgas Kohle, 114(7-8) (1998), 385-387.
Genomatica, Inc. press release, 10 pages (2008/2009).
Gnep et al., "Conversion of Light Alkanes to Aromatic Hydrocarbons; II. Role of Gallium Species in Propane Transformation on GaHZSM5 Catalysts", Applied Catalysis 1988, 43, 155-166.
Guisnet et al., "Aromatization of short chain alkanes on zeolite catalysts," Appl. Catal. A, 1992, 89, p. 1-30.
Hileman et al., "Near-Term Feasibility of Alternative Jet Fuels," 152 pages, RAND Corporation, 2009.
Hobbie et al., "Intramolecular, compound-specific, and bulk carbon isotope patterns in $C_3$ and $C_4$ plants: a review and synthesis," New Phytologist, 2004, 161, p. 371-385.
Jung et al. "Oxidative Dehydrogenation of C4 Raffinate-3 to 1,3-Butadiene in a Dual-bed Reaction System Comprising $ZnFe_2O_4$ and $Co_9Fe_3Bi_1Mo_{12}O_{51}$ Catalysts: A Synergistic Effect of $ZnFe_2O_4$ and $Co_9Fe_3Bi_1Mo_{12}O_{51}$ Catalysts" Catalysis Letters, Jul. 2008 vol. 123, pp. 239-245.

Kamath "Process Analysis for Dimerization of Isobutene by Reactive Distillation" Industrial & Engineering Chemistry Research, Feb. 1, 2006, vol. 45, pp. 1575-1582.

Krishnan et al. "Oxidative Dehydrogenation of 1-Butene over Manganese Oxide Octahedral Molecular Sieves" Journal of Catalysis, Jun. 1999, vol. 184, pp. 305-315.

Lamprecht, "Fischer-Tropsch Fuel for Use by the U.S. Military as Battlefield-Use Fuel of the Future", Energy & Fuels 2007, 21, 1448-1453.

Latshaw "Dehydration of Isobutane to Isobutene in a Slurry Reactor" Department of Energy Topical Report, 84 pages, Feb. 1994.

Lopez Nieto et al. "Selective Oxidation of n-Butane and Butenes over Vanadium-Containing Catalysts" Journal of Catalysis, Jan. 2000, vol. 189, pp. 147-157.

Mazumder et al., "Oxidative Dehydrodimerization and Aromatization of Isobutene on $Bi_2O_3$-$SnO_2$ Catalysts", Applied Catalysis A: General, 245 (2003), 87-102.

McAvoy, "Notice of Allowability," 5 pages, U.S. Appl. No. 12/327,723 (mailed Mar. 9, 2012).

McAvoy, "Office Action Summary," 5 pages, U.S. Appl. No. 12/327,723 (mailed Jan. 4, 2012).

McAvoy, "Office Action Summary," 6 pages, U.S. Appl. No. 13/441,468 (mailed Aug. 16, 2012).

McAvoy, "Office Action Summary," 7 pages, U.S. Appl. No. 12/327,723 (mailed Jan. 11, 2011).

McAvoy, "Office Action Summary," 7 pages, U.S. Appl. No. 13/441,459 (mailed Jul. 20, 2012).

McAvoy, "Office Action Summary," 8 pages, U.S. Appl. No. 12/327,723 (mailed Apr. 8, 2011).

McAvoy, "Supplemental Notice of Allowability," 4 pages, U.S. Appl. No. 12/327,723 (mailed Apr. 27, 2012).

Pines and Haag, "Alumina: Catalyst and Support. IX. The Alumina Catalyzed Dehydration of Alcohols," J. Am. Chem. Soc. 83:2847-2852 (1961).

Rossberg et al., "Chlorinated Hydrocarbons," in Ullmann's Encyclopedia of Industrial Chemistry 2002, Wiley VCH, published online Jul. 15, 2006.

Saad et al., "Characterization of various zinc oxide catalysts and their activity in the dehydration-dehydrogenation of isobutanol" Journal of the Serbian Chemical Society 2008, vol. 73(10), pp. 997-1009.

Sakuneka et al., "Synthetic Jet Fuel Production by Combined Propene Oligomerization and Aromatic Alkylation over Solid Phosphoric Acid", Ind. Eng. Chem. Res., 47 (2008), 1828-1834.

Savidge and Blair, "Intramolecular Carbon Isotopic Composition of Monosodium Glutamate: Biochemical Pathways and Product Source Identification," J. Agric. Food Chem. 2005, 53, p. 197-201.

Schmidt, "Fundamentals and systematics of the non-statistical distributions of isotopes in natural compounds," Naturwissenschaften 2003, 90, p. 537-552.

Solymosi et al., Aromatization of Isobutane and Isobutene Over $Mo_2C$/ZSM-5 Catalyst, Applied Catalysis A: General, 278 (2004), 111-121.

Speiser et al., "Catalytic Ethylene Dimerization and Oligomerization: Recent Developments with Nickel Complexes Containing P,N-Chelating Ligands", Accounts of Chemical Research 2005, 38, 784-793.

Subramani et al. "A Review of Recent Literature to Search for an Efficient Catalytic Process for the Conversion of Syngas to Ethanol" Energy and Fuels, Jan. 31, 2008 vol. 22, pp. 814-839.

Suresh et al., "Engineering Aspects of Industrial Liquid-Phase Air Oxidation of Hydrocarbons", Ind. Eng. Chem. Res. 39 (2000), 3958-3997.

Syu, "Biological production of 2,3-butanediol" Applied Microbiology and Biotechnology, Jan. 2001, vol. 55(1), pp. 10-18.

Taubert et al., "Dehydrodimerization of Isobutene to 2,5-Dimethyl-1,5-hexadiene over Bismuth(III)-Oxide and Various Additives", Chem. Eng. Technol., 29(4) (2006), 468-472.

Threadingham et al., "Rubber, 3. Synthetic," in Ullmann's Encyclopedia of Industrial Chemistry 2002, Wiley VCH, published online Apr. 30, 2004.

Tiwari et al. "Effect of aluminium oxide on the properties of Cu-Mo catalyst in the oxidative dehydrogenation of butene-1 to butadiene" Journal of Catalysis, Nov. 1989, vol. 120, pp. 278-281.

Toledo-Antonio et al. "Correlation between the magnetism of non-stoichiometric zinc ferrites and their catalytic activity for oxidative dehydrogenation of 1-butene" Applied Catalysis A: General, Aug. 2002, vol. 234, pp. 137-144.

Weber et al., "13C-Pattern of Natural Glycerol: Origin and Practical Importance," J. Agric. Food Chem. 1997, 45, p. 2042-2046.

Wyman, "Potential Synergies and Challenges in Refining Cellulosic Biomass to Fuels, Chemicals, and Power", 2003 Biotechnological Progress 19:254-62.

* cited by examiner

RENEWABLE JET FUEL BLENDSTOCK FROM ISOBUTANOL

CROSS-REFERENCE TO RELATED APPLICATIONS

This application claims the benefit of U.S. Provisional Patent Application No. 61/332,561, filed May 7, 2010, entitled "RENEWABLE JET FUEL BLENDSTOCK FROM ISOBUTANOL", which is incorporated herein by reference in its entirety.

BACKGROUND

Conventional transportation fuels (e.g., gasoline, diesel, jet fuel, etc.) are typically derived from non-renewable raw materials such as petroleum. However, the production, transportation, refining and separation of petroleum to provide transportation fuels is problematic in a number of significant ways.

For example, petroleum (e.g., crude oil and/or natural gas) production poses a number of environmental concerns. First, the history of petroleum production includes many incidents where there have been uncontrolled releases of crude petroleum during exploration and production (e.g., drilling) operations. While many of these incidents have been relatively minor in scale, there have been a number of incidents that have been significant in scale and environmental impact (e.g., BP's Deepwater Horizon incident, Mississippi Canyon, Gulf of Mexico, 2010).

In addition, world petroleum supplies are finite. Thus, as world petroleum demand has increased (84,337 M bpd worldwide in 2009; US Energy Information Administration), easily accessible reserves have been depleted. Accordingly, petroleum exploration and production operations are more frequently conducted in remote and/or environmentally sensitive areas (e.g., deepwater offshore, arctic regions, wetlands, wildlife preserves, etc.). Some remote locations require highly complex, technically challenging solutions to locate and produce petroleum reserves (e.g., due to low temperatures, water depth, etc.). Accordingly, the potential for large-scale environmental damage resulting from uncontrolled discharge of petroleum during such complex, technically challenging exploration and production operations is substantively increased.

Furthermore, when petroleum is produced in remote areas and/or areas which do not have infrastructure (e.g., refineries) to further process petroleum into useful products, the produced petroleum must be transported (e.g., via pipeline, rail, barge, ship, etc.), often over significant distances, to terminal points where the petroleum products may be refined and/or processed. Transportation of petroleum is also an operation with associated risk of accidental discharge of petroleum in the environment, with concomitant environmental damage, and there have been a number of significant incidents (e.g., Exxon's Valdez tanker spill, Prince William Sound, Alaska, 1989). Furthermore, much of the worlds proven petroleum reserves are located in regions which are politically unstable. Accordingly, supplies of petroleum from such regions may be uncertain since production of petroleum or transportation of petroleum products from such regions may be interrupted.

Petroleum is a complex mixture of chemical compounds. Crude petroleum comprises chemical entities from very the simple, e.g., helium and methane prevalent in natural gas, to the complex, e.g., asphaltenes and heterocyclic organic compounds prevalent in heavy, sour crude oil. Furthermore, crude petroleum is typically co-produced with varying amounts of formation water (e.g., water from the rock formation from which the petroleum was produced), often as stable emulsion, with salts, metals and other water-soluble compounds dissolved in the formation water. Crude oil may also contain varying amounts of particulate salts, metals, sediments, etc. Accordingly, crude oil streams are typically desalted, then allowed to settle and phase-separate into crude and water fractions, reducing the water content of the crude and the level of undesired components such as salts, metals, silt, sediment, etc. which may be present in the crude. Such undesired components are generally problematic in further processing and/or refining of petroleum into commercially useful fractions. For example, certain unit operations in the refining process may be sensitive to water, salt or sediment. Further, piping, storage and process vessels employed in the transport, storage and processing of petroleum is prone to corrosion, which may be accelerated and/or exacerbated by the presence of salt and/or water in the petroleum feedstock.

Desalting processes typically require the use of large quantities of water, which also may be heated, to extract salt and soluble metals from the crude oil. Further, the crude stream to be desalted is also generally heated to effect mixing with the extraction water. The resulting emulsions may then be treated with demulsifying agent and allowed to settle prior to further processing. Such desalting (and settling) may be time consuming, and may require (i) large quantities of water to extract the undesirable components, (ii) large amounts of energy to heat the water and/or crude stream(s) to effect mixing, and (iii) the use of substantial quantities of chemical agents to treat the crude (e.g., demulsifiers). As a result, large quantities of contaminated water are produced in desalting operation which must be treated to remove residual oil, dissolved salts, metals, water-soluble organics, demulsifiers, etc.

Furthermore, crude petroleum from various regions, different subterranean reservoirs within a region, or even from different strata within a single field may have different chemical compositions. For example, crude oils can range from "light, sweet" oils which generally flow easily, and have a higher content of lower molecular weight hydrocarbons and low amounts of contaminants such as sulfur, to heavy, sour oils, which may contain a large fraction of high molecular weight hydrocarbons, large amounts of salts, sulfur, metals and/or other contaminants, and may be very viscous and require heating to flow. Furthermore, the relative amounts of the constituent fractions (e.g., light, low molecular weight hydrocarbons vs. heavier, higher molecular weight hydrocarbons) of the various grades or types of crude oil varies considerably. Thus, the chemical composition of the feedstock for a refinery may vary significantly, and as a result, the relative amounts of the hydrocarbon streams produced may vary as a function of the crude feed.

Once the crude feedstock is sufficiently treated to remove undesired impurities or contaminants, it can then be subject to further processing and/or refining. The crude feedstock is typically subject to an initial distillation, wherein the various fractions of the crude are separated into distillate fractions based on boiling point ranges. This is a particularly energy intensive process, as this separation is typically conducted on a vast scale, and most or all of the feedstock is typically heated in the distillation unit(s) to produce various distillate fractions. Furthermore, since the crude composition is quite complex, containing hundreds of compounds (if not more), each fraction may contain many different compounds, and the composition and yield of each distillate fraction may vary depending on the type and composition of crude feedstock. Depending on the desired product distribution on the back end of a refining operation, a number of additional refining steps may be performed to further refine and/or separate the distillate streams, each of which may require additional equipment and energy input.

For example, higher boiling fractions from an initial distillation may be subject to further distillation (e.g., under vacuum) to separate the mixture even further. Alternatively, heavy fractions from an initial distillation may be subject to "cracking" (e.g., catalytic cracking) at high temperatures to reduce the average molecular weight of the components of the feed stream. Since lighter hydrocarbon fractions (e.g., containing less than 20 carbon atoms) generally have greater commercial value and utility than heavier fractions (e.g., those containing more than 20 carbon atoms), cracking may be performed to increase the value and/or utility of a heavy stream from an initial distillation. However, such cracking operations are typically very energy intensive since high temperatures (e.g., 500° C.) are generally required to effect the breakdown of higher molecular weight hydrocarbons into lower molecular weight components. Furthermore, the output from such cracking operations is also a complex mixture, and accordingly, may require additional separation (e.g., distillation) to separate the output stream into useful and/or desired fractions having target specifications, e.g., based on boiling point range or chemical composition.

Accordingly, the various component streams produced from petroleum refining and/or processing are generally mixtures. The homogeneity or heterogeneity of those mixtures may be a factor of the character of the crude feedstock, the conditions at which separations are conducted, the characteristics of a cracked stream, and the specifications of an end user for purity of a product stream. However, in practical terms, higher purity streams will require more rigorous separation conditions to isolate a desired compound from related compounds with similar boiling points (e.g., compounds having boiling points within 20, 10, or 5° C. of each other). Such rigorous separations generally require large process units (e.g., larger distillation columns) to separate more closely related compounds (e.g., compounds which have relatively close boiling points).

Furthermore, in addition to the above-described environmental concerns and energy/infrastructure costs associated with petroleum production and refining, there is mounting concern that the use of petroleum as a basic raw material in the production of fuels contributes to environmental degradation (e.g., global warming) via generation and/or release of oxides of carbon. For example, burning a gallon of typical gasoline produces over 19 pounds of carbon dioxide. Because no carbon dioxide is consumed by a refinery in the manufacture of gasoline, the net carbon dioxide produced from burning a gallon of petroleum-derived gasoline is at least as great as the amount of carbon contained in the fuel, and is typically higher when the combustion of additional petroleum required to power the refinery (e.g., for separation of petroleum to produce the gasoline) and to power the transportation vehicles, pumps along pipelines, ships, etc. that bring the fuel to market is considered.

In contrast to fossil fuels, the net carbon dioxide produced by burning a gallon of biofuel or biofuel blend, or by producing biomass derived chemicals is less than the net carbon dioxide produced by burning a gallon of petroleum derived fuel or in producing chemicals from petroleum. In addition, biomass-derived chemical and fuel production has far fewer environmental hazards associated with it, since production of biomass-derived fuels requires no drilling operations. Further, biomass-derived chemical and fuel facilities can be located in a wide range of locations relative to petroleum refineries, essentially almost anywhere appropriate feedstocks are available (e.g., where sufficient amounts of suitable plant matter are available). Thus, the requirement for transport of feedstock can minimized, as are the associated energy costs of such transport. Further, even if transport of raw materials is needed, the environmental hazards of a spill of a typical biomass feedstock (e.g., corn) are negligible. Furthermore, biomass-derived product streams are typically far less complex mixtures than product streams from petroleum refining operations. Thus, far less energy may be required to obtain product streams having desired molecular weight distributions and/or purity characteristics from biomass-based chemical production operations.

Biofuels have a long history ranging back to the beginning on the 20th century. As early as 1900, Rudolf Diesel demonstrated an engine running on peanut oil. Soon thereafter, Henry Ford demonstrated his Model T running on ethanol derived from corn. However, petroleum-derived fuels displaced biofuels in the 1930s and 1940s due to increased supply and efficiency at a lower cost.

At present, biofuels tend to be produced using local agricultural resources in many relatively small facilities, and are viewed as providing a stable and secure supply of fuels independent of the geopolitical problems associated with petroleum. At the same time, biofuels can enhance the agricultural sector of national economies. In addition, environmental concerns relating to the possibility of carbon dioxide related climate change is an important social and ethical driving force which is triggering new government regulations and policies such as caps on carbon dioxide emissions from automobiles, taxes on carbon dioxide emissions, and tax incentives for the use of biofuels.

The acceptance of biofuels depends primarily on their economic competitiveness compared to petroleum-derived fuels. As long as biofuels are more expensive than petroleum-derived fuels, the use of biofuels will be limited to specialty applications and niche markets. Today, the primary biofuels are ethanol and biodiesel. Ethanol is typically made by the fermentation of corn in the US and from sugar cane in Brazil. Ethanol from corn or sugar cane is competitive with petroleum-derived gasoline (exclusive of subsidies or tax benefits) when crude oil stays above $50 per barrel and $40 per barrel, respectively. Biodiesel is competitive with petroleum-based diesel when the price of crude oil is $60/barrel or more.

In addition to cost, the acceptance of biofuels is predicated on their performance characteristics, their ability to run in many types of existing equipment, and their ability to meet demanding industry specifications that have evolved over the last century. Fuel ethanol has achieved only limited market penetration in the automotive market in part due to its much lower energy content compared to gasoline, and other properties (such as water absorption) that hinder its adoption as a pure fuel. To date, the maximum percentage of ethanol used in gasoline has been 85% (the E85 grade), and this has found use in only a small fraction of newer, dual-fuel cars where the engines have been redesigned to accommodate the E85 fuel.

Acceptance of biofuels in the diesel industry and aviation industry has lagged even farther behind that of the automotive industry. Methyl trans-esterified fatty acids from seed oils (such as soybean, corn, etc.) have several specific disadvantages compared to petroleum-derived diesel fuels, particularly the fact that insufficient amounts of seed oil are available. Even under the most optimistic scenarios, seed oils could account for no more than 5% of the overall diesel demand. Furthermore, for diesel and aviation engines, the cold flow properties of the long chain fatty esters from seed oils are sufficiently poor so as to cause serious operational problems even when used at levels as low as 5%. Under cold conditions, the precipitation and crystallization of fatty paraffin waxes can cause debilitating flow and filter plugging problems. For aviation engines, the high temperature instability of the esters and olefinic bonds in seed oils is also a potential problem. To use fatty acid esters for jet fuel, the esters must be hydrotreated to remove all oxygen and olefinic bonds. Additionally, jet fuels must contain aromatics in order to meet the stringent energy density and seal swelling demands of jet turbine engines. Accordingly, synthetic jet fuels including hydrotreated fatty acid esters from seed oils, or synthetic fuels produced from coal must be blended with aromatic compounds derived from fossil fuels to fully meet jet fuel specifications.

Accordingly, there is a need for improved renewable jet fuel blendstocks and jet fuel blends with costs and performance properties comparable to, or superior to existing jet fuels, and which meet or exceed the requirements of ASTM D7566 10a for aviation turbine fuel containing synthetic hydrocarbons.

SUMMARY

In one embodiment, the present invention comprises a process for preparing renewable jet fuel blendstock comprising:
(a) treating biomass to form a feedstock;
(b) fermenting the feedstock with one or more species of microorganism, thereby forming one or more $C_2$-$C_6$ alcohols;
(c) dehydrating at least a portion of the one or more $C_2$-$C_6$ alcohols obtained in step (b), thereby forming a product comprising one or more $C_2$-$C_6$ olefins;
(d) isolating the one or more $C_2$-$C_6$ olefins;
(e) oligomerizing at least a portion of the one or more $C_2$-$C_6$ olefins isolated in step (d), thereby forming a product comprising one or more $C_8$-$C_{16}$ unsaturated oligomers; and
(f) hydrogenating at least a portion of the product of step (e) in the presence of hydrogen, thereby forming a renewable jet fuel blendstock comprising one or more $C_8$-$C_{16}$ saturated alkanes;
wherein said renewable jet fuel blendstock meets or exceeds the requirements of ASTM D7566-10a for hydroprocessed synthesized paraffinic kerosene (SPK).

In another embodiment, the present invention comprises a process for preparing renewable jet fuel blendstock comprising:
(a) treating biomass to form a feedstock;
(b) fermenting the feedstock with one or more species of microorganism, thereby forming isobutanol;
(c) dehydrating at least a portion of the isobutanol obtained in step (b), thereby forming a dehydration product comprising isobutene;
(d) oligomerizing at least a portion of the dehydration product, thereby forming a product comprising one or more $C_8$, one or more $C_{12}$, and one or more $C_{16}$ unsaturated oligomers; and
(e) hydrogenating at least a portion of the product of step (d) in the presence of hydrogen, thereby forming a renewable jet fuel blendstock comprising one or more $C_{12}$ and one or more $C_{16}$ saturated alkanes;
(f) adjusting the ratio of $C_{12}$ and $C_{16}$ saturated alkanes provided by step (e) to form a renewable jet fuel blendstock which meets or exceeds the requirements of ASTM D7566-10a for hydroprocessed synthesized paraffinic kerosene (SPK).

In some embodiments dehydrating, oligomerizing, and hydrogenating are each carried out in the presence of a dehydration catalyst, oligomerization catalyst, and a hydrogenation catalyst, respectively. In some embodiments, dehydrating, oligomerizing, and hydrogenating may be carried out in a different reaction zone. In certain embodiments, two or more of dehydrating, oligomerizing, and hydrogenating may be carried out in the same reaction zone.

In some embodiments, one or more of the dehydration catalyst, oligomerization catalyst, or hydrogenation catalyst are heterogeneous catalysts. In other embodiments, one or more of the dehydration catalyst, oligomerization catalyst, or hydrogenation catalyst are homogeneous catalysts.

In certain embodiments, dehydrating and/or oligomerizing may be carried out in the presence of an acidic catalyst, wherein the acidic catalyst for dehydrating and the acidic catalyst for oligomerizing is the same or different.

In some embodiments, the acidic catalyst for dehydrating and the acidic catalyst for oligomerizing are each independently selected from the group consisting of inorganic acids, organic sulfonic acids, heteropolyacids, perfluoroalkyl sulfonic acids, metal salts thereof, mixtures of metal salts, and combinations thereof. In one embodiment, the acid catalyst for oligomerizing is Amberlyst-35.

In other embodiments, hydrogenating is carried out in the presence of a hydrogenation catalyst selected from the group consisting of iridium, platinum, palladium, rhodium, nickel, ruthenium, rhenium and cobalt, compounds thereof, and combinations thereof.

In certain embodiments, the present process further comprises removing $C_2$-$C_6$ alcohols from the feedstock before said dehydrating. In certain embodiments, removing comprises carrying out the fermenting step below atmospheric pressure, whereby aqueous $C_2$-$C_6$ alcohol vapor is removed.

In some embodiments, the process further comprises separating at least a portion of said the oligomerization product comprising one or more $C_8$-$C_{16}$ unsaturated oligomers, and combining the separated portion with the one or more $C_2$-$C_6$ olefins prior to said oligomerization step.

In another aspect, the present invention comprises a renewable SPK jet fuel blendstock produced by the process described above. In some embodiments, the renewable SPK blendstock comprises at least 60 mol % of C12 components. In other embodiments, the renewable SPK blendstock comprises at least 10 mol % of C16 components.

In still another aspect, the present invention comprises a process for preparing a renewable jet fuel comprising combining a renewable jet fuel blendstock prepared according to the present method with a conventional jet fuel blendstock, whereby the renewable jet fuel meets or exceeds the requirements of ASTM D7566 10a.

In still other embodiments, the process for preparing a renewable jet fuel further includes combining the renewable jet fuel blendstock and the conventional jet fuel blendstock with one or more $C_{10}$-$C_{14}$ aromatic hydrocarbons.

In still another aspect, the present invention comprises a renewable jet fuel produced according to the present methods which meets or exceeds the requirements of ASTM D7566 10a.

In certain embodiments, the ratio of said renewable jet fuel blendstock to said conventional jet fuel blendstock is from 10:90 to 50:50. In other embodiments, the renewable jet fuel has a ratio of said renewable jet fuel blendstock to said conventional jet fuel blendstock of from 30:70 to 50:50. In still other embodiments, the renewable jet fuel has a ratio of said renewable jet fuel blendstock to said conventional jet fuel blendstock of from 40:60 to 50:50.

DETAILED DESCRIPTION

Figure 1:
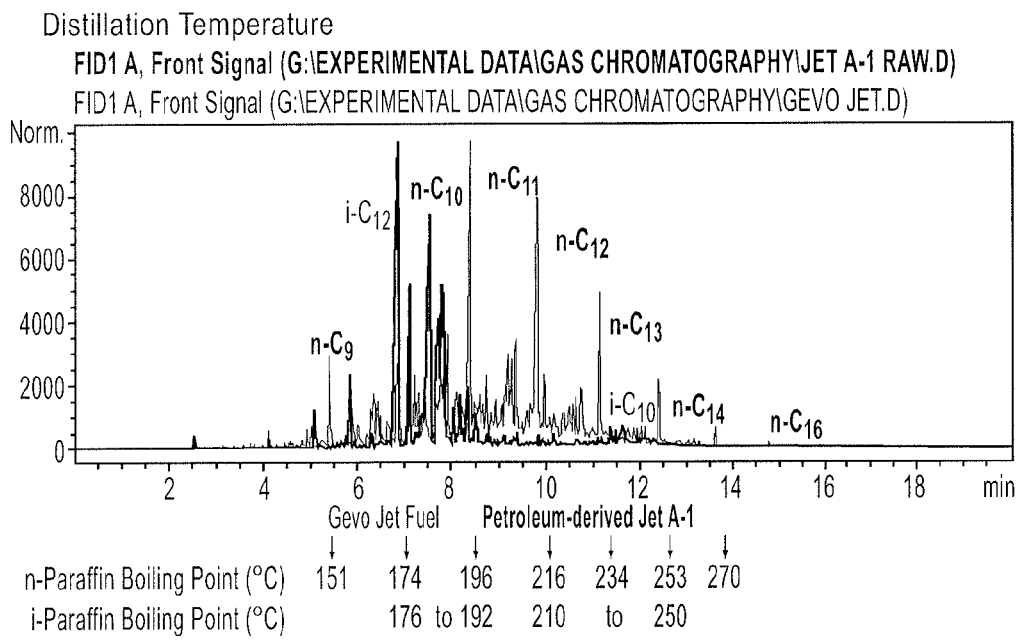
FIG. 1 is an exemplary scheme showing the production of C12-C16 oligomers from isobutene.

All documents cited herein are incorporated by reference in their entirety for all purposes to the same extent as if each individual document was specifically and individually indicated to be incorporated by reference.

The present invention advantageously provides renewable jet fuel blendstock derived from abundant biomass, using existing capital assets such as ethanol plants and typical refinery operations. Further, the present invention provides a "clean" process that enables production of jet fuel from pure compounds (e.g., isobutylene) rather than separating jet from complex mixture with many by-products (e.g., isolation from petroleum, oligomerization of mixed monomer streams, etc.). Accordingly, the present invention provides direct production of a renewable jet fuel blendstock, with minimal production of other products, in a targeted, highly specific fashion. This provides a highly product-specific process which minimizes the need for process equipment to remove and/or make use of undesired by-products typical in conventional jet production process, or in oligomerization processes which employ a wide range of monomers.

The present application provides methods to make renewable jet fuel blendstocks that meet military and ASTM blend stock requirements for renewable jet. It provides methods to adjust the composition of a renewable jet fuel blendstock to concomitantly adjust the properties thereof, to meet blend requirements for many jet fuels. These and other advantages are described below.

DEFINITIONS

"Renewably-based" or "renewable" denote that the carbon content of the renewable alcohol (and olefin, di-olefin, etc., or subsequent products prepared from renewable alcohols, olefins, di-olefins, etc. as described herein), is from a "new carbon" source as measured by ASTM test method D 6866-05, "Determining the Biobased Content of Natural Range Materials Using Radiocarbon and Isotope Ratio Mass Spectrometry Analysis", incorporated herein by reference in its entirety. This test method measures the $^{14}C/^{12}C$ isotope ratio in a sample and compares it to the $^{14}C/^{12}C$ isotope ratio in a standard 100% biobased material to give percent biobased content of the sample. "Biobased materials" are organic materials in which the carbon comes from recently (on a human time scale) fixated $CO_2$ present in the atmosphere using sunlight energy (photosynthesis). On land, this $CO_2$ is captured or fixated by plant life (e.g., agricultural crops or forestry materials). In the oceans, the $CO_2$ is captured or fixated by photosynthesizing bacteria or phytoplankton. For example, a biobased material has a $^{14}C/^{12}C$ isotope ratio greater than 0. Contrarily, a fossil-based material has a $^{14}C/^{12}C$ isotope ratio of about 0. The term "renewable" with regard to compounds such as alcohols or hydrocarbons (olefins, di-olefins, polymers, etc.) also refers to compounds prepared from biomass using thermochemical methods (e.g., Fischer-Tropsch catalysts), biocatalysts (e.g., fermentation), or other processes, for example as described herein.

A small amount of the carbon atoms. Of the carbon dioxide in the atmosphere is the radioactive isotope $^{14}C$. This $^{14}C$ carbon dioxide is created when atmospheric nitrogen is struck by a cosmic ray generated neutron, causing the nitrogen to lose a proton and form carbon of atomic mass 14 ($^{14}C$), which is then immediately oxidized, to carbon dioxide. A small but measurable fraction of atmospheric carbon is present in the form of $^{14}C_2$. Atmospheric carbon dioxide is processed by green plants to make organic molecules during the process known as photosynthesis. Virtually all forms of life on Earth depend on this green plant production of organic molecules to produce the chemical energy that facilitates growth and reproduction. Therefore, the $^{14}C$ that forms in the atmosphere eventually becomes part of all life forms and their biological products, enriching biomass and organisms which feed on biomass with $^{14}C$. In contrast, carbon from fossil fuels does not have the signature $^{14}C:^{12}C$ ratio of renewable organic molecules derived from atmospheric carbon dioxide. Furthermore, renewable organic molecules that biodegrade to $CO_2$ do not contribute to global warming as there is no net increase of carbon emitted to the atmosphere.

Assessment of the renewably based carbon content of a material can be performed through standard test methods, e.g. using radiocarbon and isotope ratio mass spectrometry analysis. ASTM International (formally known as the American Society for Testing and Materials) has established a standard method for assessing the biobased content of materials. The ASTM method is designated ASTM-D6866.

The application of ASTM-D6866 to derive "biobased content" is built on the same concepts as radiocarbon dating, but without use of the age equations. The analysis is performed by deriving a ratio of the amount of radiocarbon ($^{14}C$) in an unknown sample compared to that of a modern reference standard. This ratio is reported as a percentage with the units "pMC" (percent modern carbon). If the material being analyzed is a mixture of present day radiocarbon and fossil carbon (containing very low levels of radiocarbon), then the pMC value obtained correlates directly to the amount of biomass material present in the sample.

Throughout the present specification, reference to alcohols, olefins, di-olefins, etc., and higher molecular weight materials (e.g., isooctene/isooctane, oligomers, etc.) made from such compounds is synonymous with "renewable" alcohols, "renewable" olefins, "renewable" di-olefins, etc., and "renewable" materials (e.g., "renewable" oligomers, etc.) unless otherwise indicated. Unless otherwise specified, all such materials produced by the methods described herein are renewable unless explicitly stated otherwise.

Throughout the present specification, the terms "olefin" and "alkene" interchangeably to refer to a hydrocarbon having at least one carbon-carbon double bond. Alkenes or olefins having two carbon-carbon double bonds can be referred to as dienes, and if the two carbon-carbon double bonds are adjacent in the molecule (e.g., four adjacent $sp^2$ carbon atoms), the molecule can be termed a conjugated diene.

The renewable alcohols, olefins, di-olefins, oligomers, aliphatic and aromatic organic compounds, etc. of the present invention have pMC values of at least about 1, 5, 10, 15, 20, 25, 30, 35, 40, 45, 50, 55, 60, 65, 70, 75, 80, 85, 90, 95, 100, inclusive of all values and subranges therebetween.

Throughout the present specification, the term "about" may be used in conjunction with numerical values and/or ranges. The term "about" is understood to mean those values near to a recited value. For example, "about 40 [units]" may mean within ±25% of 40 (e.g., from 30 to 50), within ±20%, ±15%, ±10%, ±9%, ±8%, ±7%, ±6%, ±5%, ±4%, 3%, ±2%, ±1%, less than ±1%, or any other value or range of values therein or therebelow. Furthermore, the phrases "less than about [a value]" or "greater than about [a value]" should be understood in view of the definition of the term "about" provided herein.

Throughout the present specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.). Furthermore, all values within a given range may bean endpoint for the range encompassed thereby (e.g., the range 50-80 includes the ranges with endpoints such as 55-80, 50-75, etc.).

Throughout the present specification, the words. "a" or "an" are understood to mean "one or more" unless explicitly stated otherwise. Further, the words "a" or "an" and the phrase "one or more" may be used interchangeably.

The terms and/or phrases renewable jet blendstock and SPK (or variations thereof) may be used interchangeably herein, and refer to synthesized paraffinic kerosene produced according to the present methods.

The term butene (or grammatical variations thereof) as used herein generally refers to compounds comprising four carbon atoms containing a single carbon-carbon double bond.

Renewable Jet Fuel Blendstock

In one aspect, the present invention provides methods for making renewable jet fuel blendstock from isobutanol that meets or exceeds the performance and purity requirements specified in ASTM D7566-10a (which is incorporated herein by reference in its entirety). Annex 1 of ASTM D7566-10a sets forth certain property and purity requirements for hydroprocessed synthesized paraffinic kerosene (SPK). The detailed batch requirements for hydroprocessed SPK are detailed in Table A1.1 in Annex 1 of D7566-10a (reproduced herein, see Table 1, below) and most likely these specifications will also apply to new paraffinic blend stocks in future version of D7566:

TABLE 1

ASTM D7566-10a, Table A1.1 - Detailed Batch Requirements; Hydroprocessed SPK

| Property | | SPK Spec |
|---|---|---|
| Acidity, total mg KOH/g | max | 0.015 |
| Distillation Temperature (° C.) | | |
| 10% Recovered, Temp (T10) | max | 205 |
| 90% Recovered, Temp (T90) | | report |
| Final Boiling Point (° C.) | max | 300 |
| T90-T10 (° C.) | min | 22 |
| Flash Point (° C.) | min | 38 |
| Density at 15° C., kg/m$^3$ | | 730-770 |
| Freezing Point (° C.) | max | −40 |

TABLE 1-continued

ASTM D7566-10a, Table A1.1 - Detailed Batch Requirements; Hydroprocessed SPK

| Property | | SPK Spec |
|---|---|---|
| JFTOT (2.5 h at control temp) | | |
| Temperature (° C.) | min | 325 |
| Filter Pressure Drop, mm Hg | max | 25 |
| Tube Deposit Rating | max | 3 |

Other detailed requirements for hydroprocessed SPK are set forth in Table A1.2 in Annex 1 of D7566-10a (see Table 2, below):

TABLE 2

ASTM D7566-10a, Table A1.2 - Other Batch Requirements; Hydroprocessed SPK

| Property | | SPK Spec |
|---|---|---|
| Cycloparaffins, mass % | max | 15 |
| Aromatics, mass % | max | 0.5 |
| Paraffins, mass % | | Report |
| Carbon and Hydrogen, mass % | min | 99.5 |
| Nitrogen, mg/kg | max | 2 |
| Water, mg/kg | max | 75 |
| Sulfur, mg/kg | max | 15 |
| Sulfur, mass % | max | 0.0015 |
| Metals, mg/kg | max | 0.1 per metal |
| Halogens, mg/kg | max | 1 |

The present methods enable conversion of isobutanol into hydroprocessed SPK that meets the requirements specified in Annex 1 of ASTM D7566-10a, and anticipate that these requirements will not change for new paraffinic blendstocks. Additionally, the specifications prescribed by ASTM D7566-10a for blends of conventional jet fuel and SPK can guide the development of methods for producing isobutanol-derived jet blendstocks and blendstocks produced by the methods described herein. While the current SPK specification ASTM D7566-10a is specifically referenced herein, it should be noted that future versions of the ASTM specifications may change slightly, and that the methods described herein can be modified to produce an appropriate jet fuel blendstock from isobutanol. The current detailed requirements of aviation turbine fuels containing synthesized hydrocarbons are set forth in Table 1 of ASTM D7566-10a (see Table 3, below).

TABLE 3

ASTM D7566-10a, Table 1 - Detailed Requirements of Aviation Turbine Fuels Containing Synthesized Hydrocarbons

| Property | | SPK Blend Spec |
|---|---|---|
| Acidity, total mg KOH/g | max | 0.1 |
| Aromatics, vol % | max | 25 |
| Aromatics, vol % | min | 8 |
| Lubricity, mm | max | 8 |
| Distillation Temperature (° C.) | | |
| 10% Recovered, Temp (T10) | max | 205 |
| 50% Recovered, Temp (T90) | | report |
| 90% Recovered, Temp (T90) | | report |
| Final Boiling Point (° C.) | max | 300 |
| T90-T10 (° C.) | min | 40 |
| T50-T10 (° C.) | min | 15 |
| Distillation residue, % | max | 1.5 |
| Distillation loss, % | max | 1.5 |
| Flash Point (° C.) | min | 38 |

TABLE 3-continued

ASTM D7566-10a, Table 1 - Detailed Requirements of Aviation
Turbine Fuels Containing Synthesized Hydrocarbons

| Property | | SPK Blend Spec |
|---|---|---|
| Density at 15° C., kg/m$^3$ | | 775-840 |
| Freezing Point (° C.) | max | −40 Jet A, −47 Jet A-1 |
| JFTOT (2.5 h at control temp) | | |
| Temperature (° C.) | min | 260 |
| Filter Pressure Drop, mmHg | max | 25 |
| Tube Deposit Rating | max | 3 |

Production of Isobutanol

The processes of the present invention for making renewable jet fuel blendstocks as described herein typically begin with the formation of renewable (e.g., isobutanol), from biomass. The term "formation from biomass" includes any combination of methods including fermentation, thermochemical (e.g., Fischer-Tropsch), photosynthesis, etc. Renewable alcohols (e.g., isobutanol) can be prepared from biomass by the same method, or by different methods, or portions of the isobutanol can be prepared by a combination of different methods.

When renewable isobutanol is formed by fermentation, the feedstock for the fermentation process can be any suitable fermentable feedstock known in the art, for example sugars derived from agricultural crops such as sugarcane, corn, etc. Alternatively, the fermentable feedstock can be prepared by the hydrolysis of biomass, for example lignocellulosic biomass (e.g. wood, corn stover, switchgrass, herbiage plants, ocean biomass; etc.). The lignocellulosic biomass can be converted to fermentable sugars by various processes known in the art, for example acid hydrolysis, alkaline hydrolysis, enzymatic hydrolysis, or combinations thereof. In such processes, the carbohydrate component of the biomass (e.g. cellulose and hemicellulose) are broken down by hydrolysis to their constituent sugars, which can then be fermented by suitable microorganisms as described herein to provide renewable isobutanol.

Typically, woody plants comprise about 40-50% cellulose, 20-30% hemicellulose, and 20-28% lignin, with minor amounts of minerals and other organic extractives. The cellulose component is a polysaccharide comprising glucose monomers coupled with β-1,4-glycoside linkages. The hemicellulose component is also a polysaccharide, but comprising various five-carbon sugars (usually xylose and arabinose), six-carbon sugars (galactose, glucose, and mannose), and 4-O-methyl glucuronic acid and galacturonic acid residues. The cellulose and hemicellulose components are hydrolyzed to fermentable five- and six-carbon sugars which can then be used as a feedstock for the fermentation as described herein. Residual carbon compounds, lignin (a highly branched polyphenolic substance), and organic extractives (e.g., waxes, oils, alkaloids, proteins, resins, terpenes, etc.) can be separated from the sugars at various stages of the hydrolysis process and utilized in various ways, for example, burned has a fuel to provide energy/heat for the fermentation process and/or for subsequent processes (e.g., dehydration, oligomerization, dehydrogenation, etc.).

In one embodiment, isobutanol is formed by one or more fermentation steps as described herein. Any suitable microorganism can be used to prepare renewable isobutanol. Butanols (e.g., isobutanol) can be produced, for example, by the microorganisms as described in U.S. Patent Publication Nos. 2007/0092957, 2008/0138870, 2008/0182308, 2007/0259410, 2007/0292927, 2007/0259411, 2008/0124774, 2008/0261230, 2009/0226991, 2009/0226990, 2009/0171129, 2009/0215137, 2009/0155869, 2009/0155869 and 2008/02745425, etc.

Renewable isobutanol is typically produced in one or more fermentors under conditions optimized for the production of isobutanol (e.g., using microorganisms which produce high yields of isobutanol, a fermentable feedstock with suitable nutrients optimal for isobutanol-producing microorganisms, temperature conditions and isobutanol recovery unit operations optimized for isobutanol production, etc.). In particular embodiments, is produced in an ethanol fermentation plant retrofitted for the production of isobutanol, for example as described in US 2009/0171129.

In one embodiment, the retrofitted ethanol plant includes an optional pretreatment unit, multiple fermentation units, and a beer still to produce isobutanol. The isobutanol is produced by optionally pretreating a feedstock (e.g., ground corn) to form fermentable sugars in the pretreatment unit. A suitable microorganism, as described herein, is cultured in a fermentation medium comprising the fermentable sugars in one or more of the fermentation units to produce isobutanol. The isobutanol can be recovered from the fermentation medium as described herein, and as described in US 2009/0171129.

Renewable butanols can also be prepared using various other methods such as conversion of biomass by thermochemical methods, for example by gasification of biomass to synthesis gas followed by catalytic conversion of the synthesis gas to alcohols in the presence of a catalyst containing elements such as copper, aluminum, chromium, manganese, iron, cobalt, or other metals and alkali metals such as lithium, sodium, and/or potassium (*Energy and Fuels* 2008 (22) 814-839). The various alcohols, including butanols, can be separated from the mixture by distillation and used to prepare renewable butenes, and subsequently renewable jet fuels or other compounds derived from renewable butenes. Alcohols other than ethanol and isobutanol can be recovered and utilized as feedstocks for other processes, burned as fuel or used as a fuel additive, etc.

Alternatively, renewable butanols can be prepared photosynthetically, e.g., using cyanobacteria or algae engineered to produce isobutanol and/or other alcohols (e.g., using *Synechococcus elongatus* PCC7942 and *Synechocystis* PCC6803; see Angermayr et al., *Energy Biotechnology with Cyanobacteria*, Curr Opin Biotech 2009 (20) 257-261; Atsumi and Liao, *Nature Biotechnology* 2009 (27) 1177-1182; and Dexter et al., *Energy Environ. Sci.* 2009 (2), 857-864, and references cited in each of these references). When produced photosynthetically, the "feedstock" for producing the resulting renewable alcohols is light, water and $CO_2$ provided to the photosynthetic organism (e.g., cyanobacteria or algae).

Higher alcohols other than butanols or pentanols produced during fermentation (or other processes as described herein for preparing renewable butanols) may be removed from the butanol(s) prior to carrying out subsequent operations (e.g., dehydration). The separation of these higher alcohols from the butanol(s) (e.g. isobutanol) can be effected using known methods such as distillation, extraction, etc.

Isolation of Alcohols from Fermentation

When the renewable alcohols such as isobutanol are prepared by fermentation, the alcohol (e.g., isobutanol) can be removed from the fermentor by various methods, for example fractional distillation, solvent extraction (e.g., with a renewable solvent such as renewable oligomerized hydrocarbons, renewable hydrogenated hydrocarbons, renewable aromatic hydrocarbons, etc. which may be prepared as described in U.S. patent application Ser. No. 12/986,918), gas stripping, adsorption, pervaporation, etc., or by combinations of such methods, prior to dehydration. In certain embodiments, the alcohol is removed from the fermentor in the vapor phase under reduced pressure (e.g., as an azeotrope with water as described in U.S. Pat. Appl. Pub. No. 2009/0171129). In some such embodiments, the fermentor itself is operated under reduced pressure without the application of additional heat (other than that used to provide optimal fermentation conditions for the microorganism) and without the use of distillation equipment, and the produced alcohol (e.g., isobutanol) is removed as an aqueous vapor (or azeotrope) from the fermentor. In ether such embodiments, the fermentor is operated under approximately atmospheric pressure or slightly elevated pressure (e.g., due to the evolution of gases such as $CO_2$ during fermentation) and a portion of the feedstock containing the alcohol (e.g., isobutanol) is continuously recycled through a flash tank operated under reduced pressure, whereby the alcohol (e.g., isobutanol) is removed from the headspace of the flash tank as an aqueous vapor or water azeotrope. These latter embodiments have the advantage of providing for separation of the alcohol (e.g., isobutanol) without the use of energy intensive or equipment intensive unit operations (e.g., distillation), as well as continuously removing a metabolic by-product of the fermentation, thereby improving the productivity of the fermentation process. The resulting wet alcohol (e.g., isobutanol) can be dried and then dehydrated, or dehydrated wet (as described herein), then subsequently dried.

The production of renewable isobutanol by fermentation of carbohydrates typically co-produces small (<5% w/w) amounts of 3-methyl-1-butanol and 2-methyl-1-butanol and much lower levels of other fusel alcohols. One mechanism by which these by-products form is the use of intermediates in hydrophobic amino acid biosynthesis by the isobutanol-producing metabolic pathway that is engineered into the host microorganism. The genes involved with the production of intermediates that are converted to 3-methyl-1-butanol and 2-methyl-1-butanol are known and can be manipulated to control the amount of 3-methyl-1-butanol produced in these fermentations (see, e.g., Connor and Liao, *Appl Environ Microbiol* 2008 (74) 5769). Removal of these genes can decrease 3-methyl-1-butanol and/or 2-methyl-1-butanol production to negligible amounts, while overexpression of these genes can be tuned to produce any amount of 3-methyl-1-butanol in a typical fermentation. Alternatively, the thermochemical conversion of biomass to mixed alcohols produces both isobutanol and these pentanols. Accordingly, when biomass is converted thermochemically, the relative amounts of these alcohols can be adjusted using specific catalysts and/or reaction conditions (e.g., temperature, pressure, etc.).

Dehydration to Butenes

Renewable alcohols (e.g., butanol(s)) obtained by biochemical or thermochemical production routes as described herein can be converted into their corresponding olefins by reacting the alcohols over a dehydration catalyst under appropriate conditions. Typical dehydration catalysts that convert alcohols such as isobutanol into butene(s) include various acid treated and untreated alumina (e.g., γ-alumina) and silica catalysts and clays including zeolites (e.g., β-type zeolites, ZSM-5 or Y-type zeolites, fluoride-treated β-zeolite catalysts, fluoride-treated clay catalysts, etc.), sulfonic acid resins (e.g., sulfonated styrenic resins such as Amberlyst® 15), strong acids such as phosphoric acid and sulfuric acid, Lewis acids such boron trifluoride and aluminum trichloride, and many different types of metal salts including, metal oxides (e.g., zirconium oxide or titanium dioxide) and metal chlorides (e.g., Latshaw B E, Dehydration of Isobutanol to Isobutylene in a Slurry Reactor, Department of Energy Topical Report, February 1994). The dehydration reaction typically occurs over a heterogeneous catalyst such as γ-alumina at moderate temperatures (e.g., about 250-350° C.) and low pressures (e.g., 0-100 psig).

Dehydration reactions can be carried out in both gas and liquid phases with both heterogeneous and homogeneous catalyst systems in many different reactor configurations. Typically, the catalysts used are stable to the water that is generated by the reaction. The water is usually removed from the reaction zone with the product. The resulting alkene(s) either exit the reactor in the gas or liquid phase, depending upon the reactor conditions, and may be separated and/or purified downstream or further converted in the reactor to other compounds (e.g., isomers, dimers, trimers, etc.) as described herein. The water generated by the dehydration reaction may exit the reactor with unreacted alcohol and alkene product(s) and may be separated by distillation or phase separation.

Because water is generated in large quantities in the dehydration step, the dehydration catalysts used are generally tolerant to water and a process for removing the water from substrate and product may be part of any process that contains a dehydration step. For this reason, it is possible to use wet (e.g., up to about 95% or 98% water by weight) alcohol as a substrate for a dehydration reaction, then remove water introduced with alcohol in the reactor feed stream with the water generated by the dehydration reaction during or after the dehydration reaction (e.g., using a zeolite catalyst such as those described U.S. Pat. Nos. 4,698,452 and 4,873,392). Additionally, neutral alumina and zeolites can dehydrate alcohols to alkenes but generally at higher temperatures and pressures than the acidic versions of these catalysts. In certain embodiments, the alkene(s) produced in the dehydration reaction are isolated after the dehydration step, before being used as feedstocks for subsequent oligomerization to form jet blendstock.

When 1-butanol, 2-butanol, or isobutanol are dehydrated, a mixture of four $C_4$ olefins—1-butene, cis-2-butene, trans-2-butene; and isobutene—can be formed. The exact concentration in a product stream of each butene isomer is determined by the thermodynamics of formation of each isomer. Accordingly, the reaction conditions and catalysts used can be manipulated to affect the distribution of butene isomers in the product stream. Thus, one can obtain butene mixtures enriched in a particular isomer. However, while production of a single butene isomer by dehydration is generally difficult, conditions can be optimized to favor the production of a preferred isomer. For example, dehydration of isobutanol at 280° C. over a γ-alumina catalyst can be optimized to produce up to 97% isobutene despite an expected equilibrium concentration of ~57% at that temperature. However, there is currently no known method for cleanly dehydrating isobutanol to 99+% isobutene (Saad L and Riad M, *J Serbian Chem Soc* 2008 (73) 997). Thus, dehydration of isobutanol typically yields a mixture of butenes, primarily isobutylene. However, in certain cases, larger amounts of linear butenes may be desired, and process conditions may be adjusted accordingly. The product butenes are then separated from the bulk of the water by, e.g., distillation, etc.

Methods for Producing Renewable Jet Fuel Blendstock

Butenes produced as described above may be reacted over a heterogeneous acidic catalyst, such as sulfonic acid resin, solid phosphoric acid, or acidic zeolite, or any other suitable catalyst at moderate temperatures (e.g., 100-300° C.) and pressures (e.g., 0-1000 psig) to form a blend of C8-C16 oligomers of butene(s). Heterogeneous or homogenous oligomerization catalysts can be used in the process of the present invention (see, e.g., G. Busca, "Acid Catalysts in Industrial Hydrocarbon Chemistry" *Chem Rev* 2007 (107) 5366-5410. Of the many methods for oligomerizing alkenes, the most relevant processes for the production of fuels generally employ acidic solid phase catalysts such as alumina and zeolites (see, e.g., U.S. Pat. Nos. 3,997,621; 4,663,406; 4,612,406; 4,864,068; and 5,962,604). In certain embodiments acidic resin catalysts may be employed. In one embodiment, the oligomerization catalyst is Amberlyst-35.

Various methods can be used for controlling the molecular weight distribution of the resulting oligomers, including methods which form primarily dimers including isooctene (see, e.g., U.S. Pat. No. 6,689,927), trimers (see, e.g., PCT Pat. Appl. Pub. No. WO 2007/091862), and tetramers and pentamers (see e.g., U.S. Pat. No. 6,239,321). In some embodiments, as discussed below, the amounts of C12 and C16 isomers may be optimized based on the characteristics of the conventional fuel with which the present mixtures are to be blended.

The C12 and C16 fraction of the oligomer mixture may be further processed to form a jet fuel blendstock. The C8 fraction may be removed and used for, e.g., a gasoline blendstock or petrochemicals, or the C8 olefin may be removed and dimerized to produce additional C16 and/or reacted with butenes to form additional C12 components (e.g., thereby adjusting the ultimate ratio of C12 to C16 components formed by the process of the present invention). C20 and larger oligomers may be used as fuel oil or may be cracked to form additional C10-C16 paraffins for jet fuel and C3-C6 olefins, which may be oligomerized as described herein to produce appropriate hydrocarbon jet fuel blend stock components. FIG. 1 is an overlay of gas chromatogram traces of an isobutanol-derived C12/C16 blend and a conventional jet fuel. As shown in FIG. X, C12/C16 blends as described herein are suitable for use in jet fuel blends, and boil within acceptable limits specified by ASTM D7566 10a.

Figure 2:
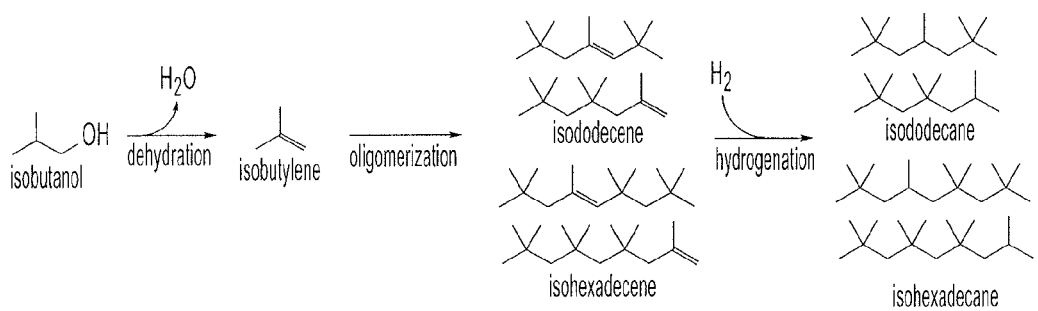
FIG. 2 is a gas chromatogram of an exemplary C12/C16 mixture produced by oligomerization and hydrogenation of isobutanol-derived butenes.
Figure 3:
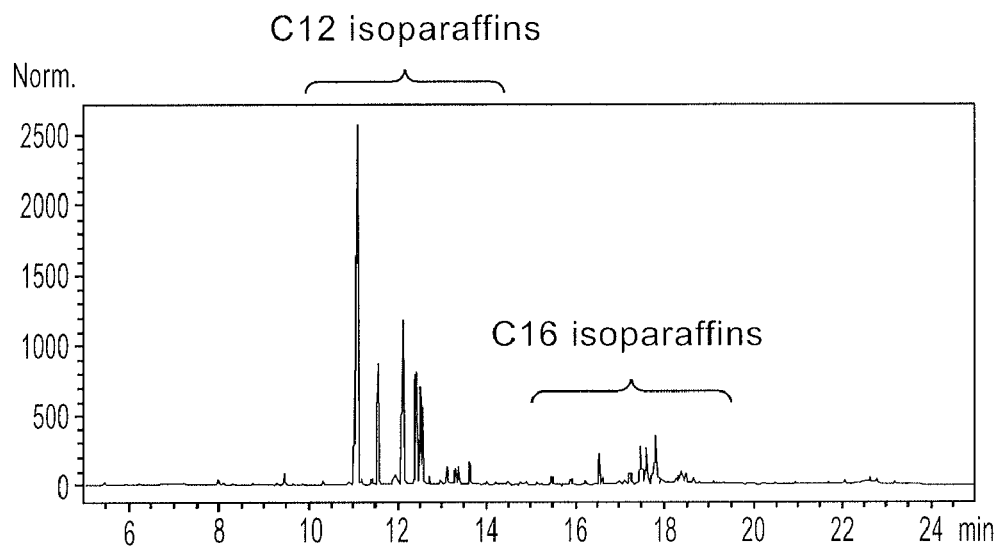
FIG. 3 shows a gas chromatogram of an exemplary C12/C16 mixture produced by oligomerization/hydrogenation of isobutanol-derived butenes as described herein

Oligomerization conditions may be optimized as described herein to limit production of light or heavy components which simplifies the downstream fractionation step. While certain specific C12 and C16 isomers may predominate (see FIG. 2), many structural isomers of C12 and C16 olefins may be produced (e.g., when linear butenes are present), resulting in a jet fuel with a distribution of hydrocarbons with varying properties (e.g., number of carbons, degree of branching). As described herein, the ratio of C12 and C16 components may be optimized to produce a jet fuel blendstock with desired properties, (e.g., by appropriate selection of catalyst, reaction time, temperature, pressure, etc. during the oligomerization step) to meet the requirements of ASTM D7566-10a. FIG. 3 shows an exemplary gas chromatogram of a typical C12/C16 mixture produced by oligomerization/hydrogenation of isobutanol-derived butenes as described herein. Lighter and/or heavier fractions from the oligomerization reaction may be removed (by, e.g., distillation, etc.) prior to further processing to provide a hydrogenation feedstock that will produce a jet fuel blendstock suitable that will meet the requirements of ASTM D7566-10a alter hydrogenation, hydrotreating, etc. Alternatively, lighter and heavier fraction may be separated after hydrogenation/hydrotreating.

Reaction modifiers such as t-butanol or other alcohols, which are typically used to promote dimer formation over trimer/tetramer formation, are excluded from the oligomerization to reduce formation of dimer. In addition water is removed from the butene feed stock (e.g., by passing over a desiccant, condensing, etc. to prevent alcohol/ether formation during the oligomerization reaction, which may undesirably increase dimer formation.

Temperatures for isobutylene trimer and/or tetramer formation in the presently described oligomerization reaction are generally higher than those typical for dimer formation. Typically, a reaction temperature of from about 60° C. to about 80° C. will favor the formation of dimers of isobutylene. Temperatures which favor the formation of trimers and/or tetramers of isobutylene are typically from about 100° C. to about 110° C. However, it will be appreciated by those skilled in the art that these temperatures are approximate and other reaction variables (e.g., feed rate, feed purity, catalyst identity, reactor configuration, residence time, etc.) may affect the temperature employed for forming a preferred mixture favoring trimer and/or tetramer formation.

One feature which may favor the formation trimers and/or tetramers relative to dimers is the absence of absence of polar compounds (e.g., alcohols, ethers, etc.) which may modify the reactivity of a catalyst. Accordingly, isobutylene feedstocks which are substantially free of such polar compounds may favor the formation of trimers and tetramers of isobutylene. Accordingly, in some embodiments, the isobutylene feedstock is substantially pure isobutylene (e.g., greater than about 85% isobutylene, greater than about 90% isobutylene, greater than about 95% isobutylene, greater than about 96% isobutylene, greater than about 97% isobutylene, greater than about 98% isobutylene, greater than about 99% isobutylene, or any other value or range of values therein or thereabove). Such purity levels may be effected by well-known separation methods (e.g., fractionation, etc.).

Reaction pressure generally does not affect product distribution. However, conducting the present oligomerization process at higher pressures (e.g., about 250 psi or greater) may be employed to keep the butene feedstock and/or products in the liquid phase tier heat management (i.e., to control the reaction temperature by absorbing heat produced by the exothermic oligomerization reaction).

The oligomerization process typically produces mixture of C8/C12/C16 olefins. However, a range of products may be formed in the present oligomerization reaction. For example, compounds comprising from 1-20 or more carbon atoms may be formed. Such compounds may be linear, branched, cyclic or caged, and may contain one or more unsaturated carbon-carbon bonds (e.g., double or triple bond). However, the present oligomerization process is typically operated to produce C12-C16 compounds suitable for use in jet fuel blends. Such compounds may include C12 compounds, C13 compounds, C14 compounds, C15 compounds and C16 compounds, each of which may be linear, branched, cyclic or caged, and may contain one or more unsaturated carbon-carbon bonds.

The distribution of C8 to C12 to C16 products obtained in the present oligomerization reactions may depend on many factors (e.g., feed rate, feed purity, catalyst identity, reactor configuration, residence time, etc.). Dimer may be present in the oligomerization product stream from about 1 mol % to about 40 mol % (e.g., about 5 mol % to about 30 mol %, about 10 mol % to about 25 mol %, about 15 mol % to about 20 mol %, or any other value or range of values therein). Trimer may be present in the oligomerization product stream from about 40 mol % to about 90 mol % (e.g., about 50 mol % to about 80 mol %, about 60 mol % to about 70 mol %, or any other value or range of values therein). Tetramer may be present in the oligomerization product stream from about 1 mol % to about 30 mol % (e.g., about 5 mol % to about 25 mol %, about 10 mol % to about 20 mol %, or any other value or range of values therein). In a typical oligomerization reaction as described herein, a selectivity of about 20/70/10 for dimer/trimer/tetramer may be realized. Overall conversion may be greater than about 80%, greater than about 85%, greater than about 90%, greater than about 91%, greater than about 92%, greater than about 93%, greater than about 94%, greater than about 95%, greater than about 96%, greater than about 97%, greater than about 98%, greater than about 99%, or any other value or range of values therein. Typical conversions range from about 90% to about 99%.

Unreacted butene and its dimer (or other products) may be separated from the oligomerization mixture (by, e.g., fractionation, etc.) after the oligomerization reaction and recycled back into the reactor with the butene feed stock or used for other applications. The recycled stream (e.g., comprising dimer) may act a diluent to absorb heat, and may further react with itself (or with butene feedstock) to form C12 or C16 oligomers. The presence of recycled dimer may proportionally increase the amount of the amount of C16 oligomer in a product stream compared to single pass (i.e., no recycle of dimer) oligomerization reaction product distributions. Alternatively, a portion of the crude reactor effluent may be recycled (e.g., without any additional separation process). In certain embodiments, the present oligomerization reaction may employ a recycle ratio ranging from about 0:1:1 to about 10:1 (e.g., about 0.2:1 to about 9:1, about 0.5:1 to about 8:1, about 1:1 to about 7:1, about 2:1 to about 6:1, about 3:1 to about 5:1, or any other value or range of values therein). In exemplary oligomerization reactions as described herein, with no recycle the yield of tetramer in the product mixture is about 10 mol %. At a 1:1 recycle rate the yield of tetramer increases to about 12 mol %. At a 2:1 recycle rate, the tetramer yield increases to about 14%. In other embodiments, the process is conducted without recycle. Recycle ratios may be of a fraction of the crude product stream, or may be of a purified fraction of the product stream (e.g., enriched in unreacted C4 Components and C8 dimers).

The recycle rate and reaction temperature may be selected to optimize the product distribution and maximize C16 levels in the product stream. Accordingly, after an oligomerization process, substantially all of the isobutanol-derived butene feedstock described above is converted into C12/C16 olefinic oligomers (except for a small quantity of C8 dimer present in the recycle loop).

Hydrogenation/Hydrotreating of C12 and C16 Olefins

The jet fuel fraction of the oligomerization reaction described above jet may then be hydrogenated/hydrotreated to saturate all olefinic bonds. This step is performed to ensure the product jet fuel blendstock meets or exceeds the thermal oxidation requirements specified in ASTM D7566-10a. Hydrogenation/hydrotreating is typically performed over conventional hydrogenation or hydrotreat catalysts, and may include non-metallic resins, or metallic catalysts containing, e.g., palladium, rhodium, nickel, ruthenium, platinum, rhenium, cobalt, molybdenum compounds thereof, combinations thereof, and the supported versions thereof.

When the hydrogenation or hydrotreating catalyst is a metal, the metal catalyst may be a supported or an unsupported catalyst. A supported catalyst is one in which the active catalyst agent is deposited on a support material e.g. by spraying, soaking or physical mixing, followed by drying, calcination, and if necessary, activation through methods such as reduction or oxidation. Materials frequently used as supports are porous solids with high total surface areas (external and internal) which can provide high concentrations of active sites per unit weight of catalyst. The catalyst support may enhance the function of the catalyst agent; and supported catalysts are generally preferred because the active metal catalyst is used more efficiently. A catalyst which is not supported on a catalyst support material is an unsupported catalyst.

The catalyst support can be any solid, inert substance including, but not limited to, oxides such as silica, alumina, titania, calcium carbonate, barium sulfate, and carbons. The catalyst support can be in the form of powder, granules, pellets, or the like. A preferred support material of the present invention is selected from the group consisting of carbon, alumina, silica, silica-alumina, titania, titania-alumina, titania-silica, barium, calcium, compounds thereof and combinations thereof. Suitable supports include carbon, $SiO_2$, $CaCO_3$, $BaSO_4$, $TiO_2$, and $Al_2O_3$. Moreover, supported catalytic metals may have the same supporting material or different supporting materials.

In one embodiment, the support is carbon. Further useful supports are those, including carbon, that have a surface area greater than 100-200 $m^2/g$. Other useful supports are those, such as carbon, that have a silt fade area of least 300 $m^2/g$. Commercially available carbons which may be used include those sold under the following trademarks: Bameby & Sutcliffe™, Darco™, Nuchar™, Columbia JXN™, Columbia LCK™, Calgon PCB™, Calgon BPL™, Westvaco™, Norit™ and Barnaby Cheny NB™. The carbon can also be commercially available carbon such as Calsicat C, Sibunit C, or Calgon C (commercially available under the registered trademark Centaur®).

Particular combinations of catalytic metal and support system suitable for use in the methods of the present invention include nickel on carbon, nickel on $Al_2O_3$, nickel on $CaCO_3$, nickel on $TiO_2$, nickel on $BaSO_4$, nickel on $SiO_2$, platinum on carbon, platinum on $Al_2O_3$, platinum on $CaCO_3$, platinum on $TiO_2$, platinum on $BaSO_4$, platinum on $SiO_2$, palladium on carbon, palladium on $Al_2O_3$, palladium on $CaCO_3$, palladium on $TiO_2$, palladium on $BaSO_4$, palladium on $SiO_2$, iridium on carbon, iridium on $Al_2O_3$, iridium on $SiO_2$, iridium on $CaCO_3$, iridium on $TiO_2$, iridium on $BaSO_4$, rhenium on carbon, rhenium on $Al_2O_3$, rhenium on $SiO_2$, rhenium on $CaCO_3$, rhenium on $TiO_2$, rhenium on $BaSO_4$, rhodium on carbon, rhodium on $Al_2O_3$, rhodium on $SiO_2$, rhodium on $CaCO_3$, rhodium on $TiO_2$, rhodium on $BaSO_4$, ruthenium on carbon, ruthenium on $Al_2O_3$, ruthenium on $CaCO_3$, ruthenium on $TiO_2$, ruthenium on $BaSO_4$, and ruthenium on $SiO_2$, cobalt on carbon, cobalt on $Al_2O_3$, cobalt on $CaCO_3$, cobalt on $TiO_2$, cobalt on $BaSO_4$, and cobalt on $SiO_2$.

Raney metals or sponge metals are one class of catalysts useful for the present invention. A sponge metal has an extended "skeleton" or "sponge-like" structure of metal, with dissolved aluminum, and optionally contains promoters. The sponge metals may also contain surface hydrous oxides, absorbed hydrous radicals, and hydrogen bubbles in pores. Sponge metal catalysts can be made by the process described in U.S. Pat. No. 1,628,190, the disclosure of which is incorporated herein by reference.

In various embodiments, the sponge metals include nickel, cobalt, iron, ruthenium, rhodium, iridium, palladium, and platinum. Sponge nickel or sponge cobalt are particularly useful as catalysts. The sponge metal may be promoted by one or more promoters selected from the group consisting of Group IA (lithium, sodium, potassium), IB (copper, silver, and gold), IVB (titanium and zirconium), VB (vanadium), VIB (chromium, molybdenum, and tungsten), VIIB (manganese, rhenium), and VIII (iron, cobalt, nickel, ruthenium, rhodium, palladium, osmium, iridium, and platinum) metals. The promoter can be used in an amount useful to give desired results. For example, the amount of promoter may be any amount less than 50% by weight of the sponge metal, 0 to 10% by weight, 1 to 5% by weight, or any other value or range of values therein.

Sponge nickel catalysts contain mainly nickel and aluminum. The aluminum is typically in the form of metallic aluminum, aluminum oxides, and/or aluminum hydroxides. Small amounts of other metals may also be present either in their elemental or chemically bonded form, such as iron and/or chromium, and may be added to the sponge nickel to increase activity and selectivity for the hydrogenation of certain groups of compounds. In certain embodiments, chromium and/or iron promoted sponge nickel is employed as a catalyst.

Sponge cobalt catalysts also contain aluminum and may contain promoters. In certain embodiments, the promoters are nickel and chromium, for example in amounts of about 2% by weight based on the weight of the catalyst. Examples of suitable sponge metal catalysts include Degussa BLM 112W, W. R. Grace Raney® 2400, Activated Metals A-4000™, and W. R. Grace Raney® 2724.

As stated above, useful catalytic metals include component iridium, palladium, rhodium, nickel, ruthenium, platinum, rhenium and cobalt; and useful support materials include carbon, alumina, silica, silica-alumina, titania, titania-alumina, titania-silica, barium, calcium, particularly carbon, $SiO_2$, $CaCO_3$, $BaSO_4$ and $Al_2O_3$. A supported catalyst may be made from any combination of the above named metals and support materials. A supported catalyst may also, however, be made from combinations of various metals and/or various support materials selected from subgroup(s) of the foregoing formed by omitting any on or more members from the whole groups as set forth in the lists above. As a result, the supported catalyst may in such instance not only be made from one or more metals and/or support materials selected from subgroup (s) of any size that may be formed from the whole groups as set forth in the lists above, but may also be made in the absence of the members that have been omitted from the whole groups to form the subgroup(s). The subgroup(S) formed by omitting various members from the whole groups in the lists above may, moreover, contain any number of the members of the whole groups such that those members of the whole groups that are excluded to form the subgroup(s) are absent from the subgroup(s). For example, it may be desired in certain instances to run the process in the absence of a catalyst formed from palladium on carbon.

The optimal amount of the metal in a supported catalyst depends on many factors such as method of deposition, metal surface area, and intended reaction conditions, but in many embodiments can vary from about 0.1 wt % to about 20 wt % of the whole of the supported catalyst (catalyst weight plus the support weight). In particular embodiments, the catalytic metal content range is from about 0.1 wt % to about 10 wt % by weight of the whole of the supported catalyst. In yet other embodiments, the catalytic metal content range is from about 1 wt % to about 7 wt % by weight of the whole of the supported catalyst. Optionally, a metal promoter may be used with the catalytic metal in the method of the present invention. Suitable metal promoters include: 1) those elements from groups 1 and 2 of the periodic table; 2) tin, copper, gold, silver, and combinations thereof; and 3) combinations of group 8 metals of the periodic table in lesser amounts.

Temperature, solvent, catalyst, pressure and mixing rate are all parameters that may affect hydrogenation/hydrotreating. The relationships among these parameters may be adjusted to effect the desired conversion, reaction rate, and selectivity in the reaction of the process.

In one embodiment, the hydrogenation/hydrotreating temperature is from about 25° C. to 350° C. (e.g., from about 50° C. to about 250° C., or any other value or range of values therein), and in certain embodiments, from about 50° C. to 200° C. The hydrogen pressure can be about 0.1 to about 20 MPa, or about 0.3 to 10 MPa, and in certain embodiments from about 0.3 to about 4 MPa. The reaction may be performed neat or in the presence of a solvent. Useful solvents include those known in the art of hydrogenation such as hydrocarbons, ethers, and alcohols (where the alcohols and ethers, or hydrocarbon solvents can be renewable). In particular embodiments, alcohols such as linear, branched or cyclic alkanols like methanol, ethanol, propanols, butanols, and pentanols are useful. Selectivity of at least about 70% is attainable in the process of the present invention, for example selectivity of at least 85%, at least 90%, or any other value or range of values therein or thereabove. Selectivity is the weight percent of the converted material that is a saturated hydrocarbon where the converted material is the portion of the starting material that participates in the hydrogenation reaction.

Upon completion of the hydrogenation reaction, the resulting mixture of products may be separated by conventional methods (e.g., distillation, etc.). Material which has not been completely converted to saturated hydrocarbons may be recycled.

Separation of the C12 and C16 Isoparaffins

Lighter alkanes (e.g., C8 components) that may remain after oligomerization and hydrogenation/hydrotreating may then be removed (by, e.g., distillation) such that the jet fuel blendstock meets the flash point and distillation requirements of ASTM D7566-10a. Similarly, C20 and higher hydrocarbons, when present, are also removed to meet the final boiling point specification of ASTM D7566-10a. As discussed above, fractionation may be used to separate the oligomers in olefin form prior to hydrogenation/hydrotreating, or after hydrogenation/hydrotreating.

Alternative Processes to Make Jet Fuel Blendstock

The process described above produces primarily C12 and C16 isoparaffins in proportions that meet the requirements in D7566-09. In some cases, it may be desirable to provide additional molecular weight renewable isoparaffins to the blendstock. Thus, in certain embodiments, other methods and strategies can be used to obtain a more diverse mixture of isoparaffins.

Conversion of Butenes to C3-C6 Olefins

In certain embodiments, butenes obtained by dehydration of isobutanol as described herein may be passed over a catalyst which converts a portion of the butenes into C3-C6 olefins. The entire C3-C6 olefin mixture may then be passed over an oligomerization catalyst to produce a C10-C16 olefin mixture which, upon hydrogenation/hydrotreating, meets or exceeds the specifications in D7566-10a. An example of an appropriate catalyst is a tungsten oxide-based olefin metathesis catalyst, operated at typical olefin metathesis conditions known in the art. Co-catalysts such as magnesium oxide, which can isomerize or promote the migration of double bonds, may also be used. Additional olefins such as renewable ethylene derived from ethanol may be added to the reaction to increase olefin diversity.

Cracking of C16 and Higher Hydrocarbons

In certain embodiments, conventional hydrocarbon cracking technologies may be employed to convert C16 and higher hydrocarbons to produce C10-C16 hydrocarbons and other smaller, light hydrocarbons, including C3-C6 olefins (which may be oligomerized to C10-C16 olefins as described herein). The cracking process may in include a reaction zone which isomerizes the C10-C16 hydrocarbons to mixtures of branched isomers. The feedstock for the cracking and optional isomerization step may be olefins from the oligomerization reaction or paraffins from the hydrogenation reaction.

Oligomerization to Produce Less Branched Oligomers

Figure 4:
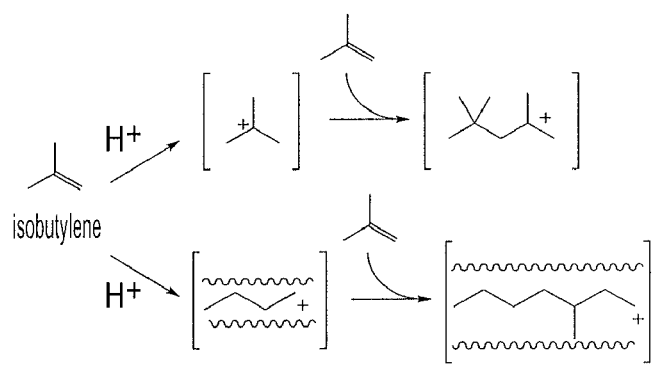
FIG. 4 is a schematic of an exemplary process for producing less branched hydrocarbons.

In other embodiments, less branched oligomers of C12/C16 mixtures may be desired, especially where boiling point diversity and increased cetane values are desired. Less branched oligomers may be obtained by conducting the oligomerization process in the pores of a heterogeneous oligomerization catalyst. The pore size in such catalysts may be selected such that they are too small for highly branched oligomers to from within them. In such a catalyst system, the surface sites (e.g., acidic sites not in the size-restricted pores) may be inactivated. In some embodiments, however, the pores may remain activated. If the surface sites are inactivated, oligomers will only be formed at the catalytic cites within the catalyst pores, and accordingly, only those oligomers which can "fit" (e.g., are not highly branched) within the catalyst pores are produced, and the resultant oligomeric mixture will comprise less branched mixtures of oligomers. Conversely, if surface catalytic sites remain activated, a mixture of highly branched and less branched material will be produced. FIG. 4 shows an exemplary catalyst schematic having both surface activated sites and pores sites. As show, surface sites will allow formation of more highly branched oligomers, whereas the size-constrained pores will favor formation of less branched oligomers.

Figure 5:
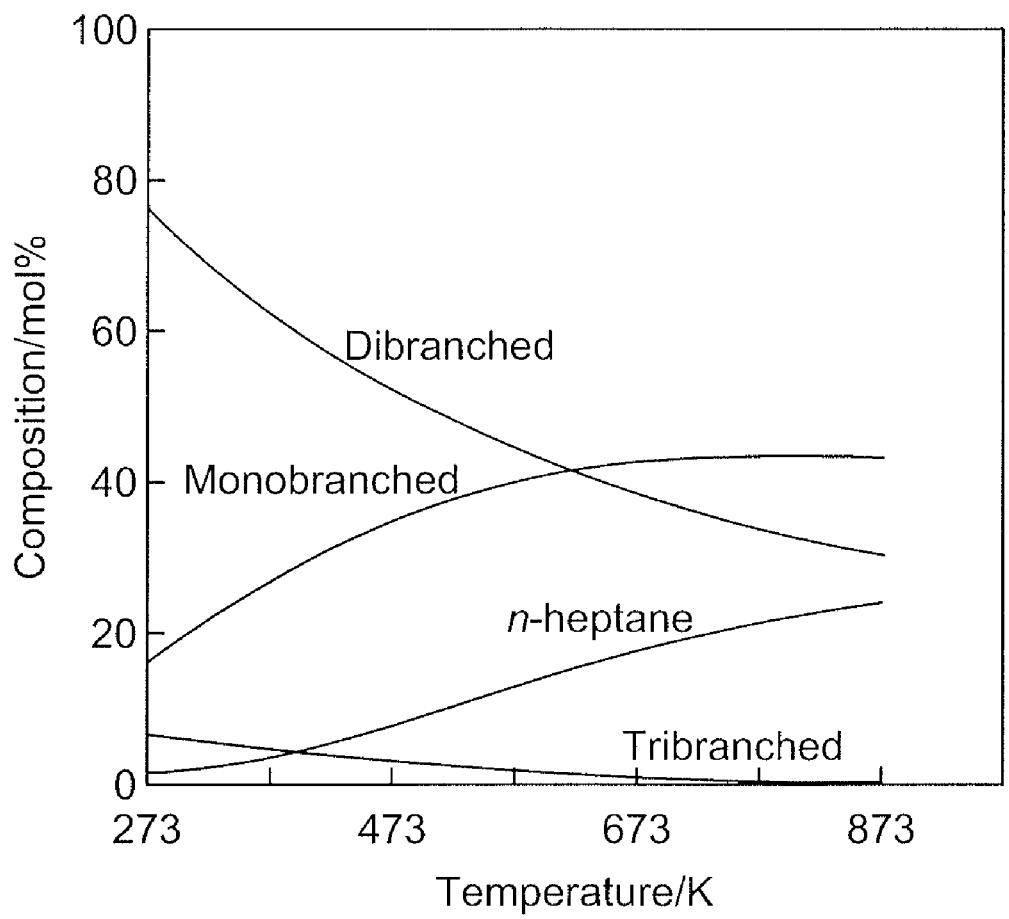
FIG. 5 is a diagram showing a series of temperature-dependent equilibrium compositions of heptanes.

In some cases, less branched olefins produced in the pores of a heterogeneous oligomerization catalyst may be smaller than desired for use in a jet fuel blendstock (e.g., C8 oligomers). Such smaller oligomers may be separated from the jet blendstock mixture, then returned to an oligomerization reaction as described herein to forth, e.g., C10-C16 hydrocarbons by dimerization or reaction with other olefins. Furthermore, higher temperatures in an oligomerization reaction generally favor the formation of less branched hydrocarbons. Accordingly, higher temperatures can be employed in oligomerization process described herein to provide increased amounts of less branched oligomers, or to increase the isomer diversity in an oligomerization product. For example, FIG. 5 shows a series of temperature-dependent equilibrium compositions of heptanes with different degrees of branching based on carbocation stability over acid catalysts (reproduced from Okuhara T., *J. Jap. Petrol. Inst.* 2004 (1) 1; incorporated herein by reference).

Formulation of Jet Fuel Blendstock

Figure 6:
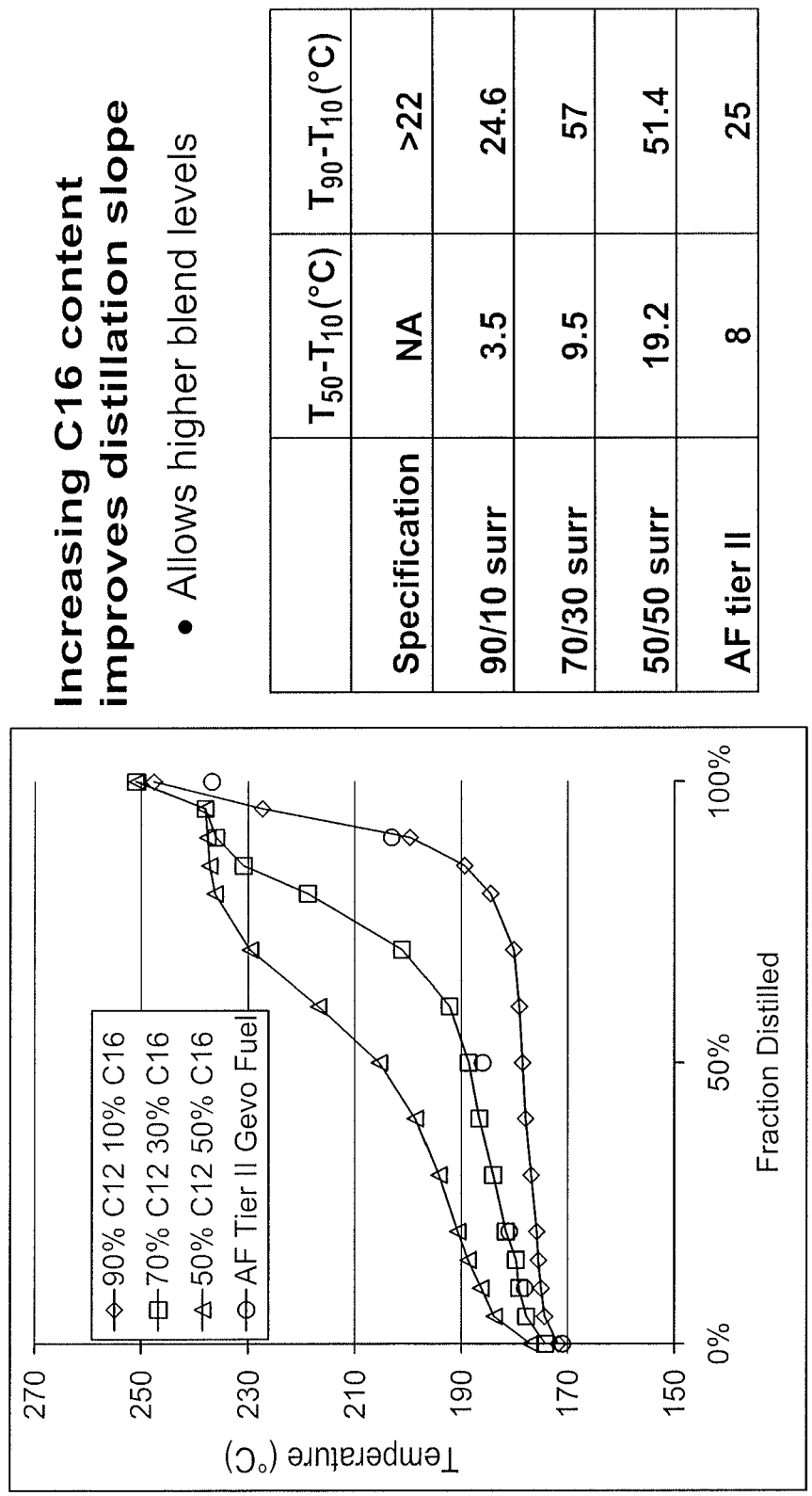
FIG. 6 is shows distillation curves for several exemplary SPK blends comprising varying ratios of C12 and C16 oligomers produced as described herein.
Figure 7:
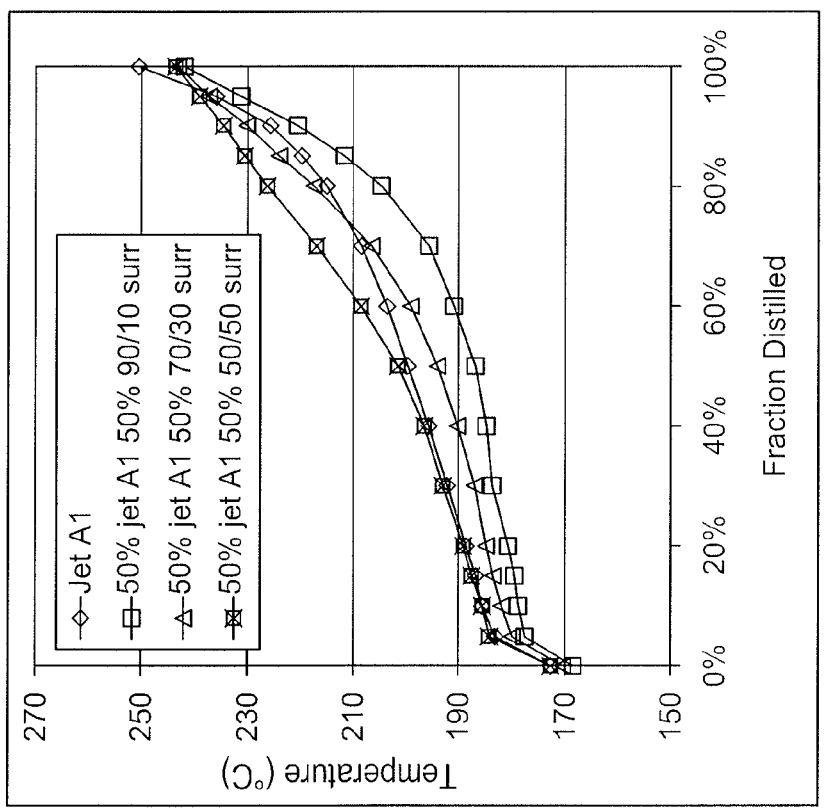
FIG. 7 is a diagram showing distillation curves for several jet blends as a function of content of C12 and C16 components.

In some embodiments the present invention provides methods for blending or synthesized paraffinic kerosene with conventional jet fuel blendstocks to form a jet fuel which substantially meets or exceeds the specifications of ASTM D7566-10a. Each of the C12 and C16 isoparaffins produced by the processes described herein will meet most of the performance requirements described in Annex 1 of D7566-10a, such as freeze point, flash point, density, and thermal oxidation stability (see Table 3, above). Furthermore, to meet the distillation requirements of pure SPK and blends of SPK with conventional jet, the relative amounts of C12 and C16 isomers can be adjusted. In some embodiments, conventional jet fuels which cannot alone meet the $T_{50}$-$T_{10}$ distillation specification in D7566-10a can be blended with an appropriate C12/C16 mixture produced by the methods described herein to meet the distillation specification in addition to all other specifications in D7566-09. For example, FIG. 6 shows distillation curves for several blends comprising varying ratios of C12 and C16 oligomers produced as described herein. As shown, varying the ratio of C12 to C16 components in a SPK blendstock can "tune" the boiling point characteristics of the final jet blend. The slope of the distillation curve can be adjusted by varying the ratio of C12 to C16 components, as shown in FIG. 7.

To obtain an optimal proportion of C12 and C16, the oligomerization conditions as described herein are tuned appropriately to directly produce the right mixture (e.g., catalyst selection, temperature, WHSV, recycle rate of C8 oligomer, etc.). Alternatively, relatively pure distillation cuts of C12 and C16 may be obtained from distillation an oligomerization mixture described herein, and then blended with a conventional jet fuel. As shown in Table 4 (below), the characteristic properties of C12 and C16 components may be considered and relative amounts may be selected to yield a jet blend with the desired properties.

TABLE 4

Properties of C12 and C16 Isoparaffins

| | Flash Point (° C.) | Melting Point (° C.) | Density |
|---|---|---|---|
| Isododecane | 43 | −81 | 0.747 |
| Isohexadecane | 96 | −70 | 0.793 |

Furthermore, the relative amounts of C12 and C16 may be selected and/or adjusted depending on the properties and/or composition of the conventional jet to blended.

ASTM D7566-10a specifies a minimum aromatic content of 8% for blends of synthetic jet fuel with conventional jet fuel. Accordingly, when the aromatic content in a conventional jet fuel is low prior to blending with SPK (which has less than 0.5% aromatic content per ASTM D7566-10a), it may be necessary to add aromatics to the synthetic jet fuel blend to meet the 8% minimum volume aromatic specification for blends. The aromatics added to the synthetic jet fuel may be from conventional sources or renewable sources. For example, PCT/US2008/085423 describes renewable aromatics derived from isobutanol. Thus, in certain embodiments, the aromatic content of a blend of conventional jet and SPK may be adjusted by adding renewable aromatics (e.g., by dehydrocyclizing isobutene oligomers such as isobutene dithers and/or trimers). Alternatively, the aromatic content may be adjusted by adding conventionally-derived (e.g., petroleum-derived) aromatics. In either case, aromatics may be blended with the isobutanol-derived renewable C12 and C16 mixtures described herein to produce jet fuel blend stocks that the meet or exceed the specifications in D7566-10a.

Blending SPK with Conventional Jet Fuel

A number of parameters may determine the blending method for preparing a SPK/conventional jet blend. Two parameters which may influence the blending process for conventional jet with the renewable C12/C16 blendstocks described herein may include aromatic content (as described above; minimum 8% for a final blend) and distillation requirements ($T_{90}$-$T_{10}$ of pure blend stock, $T_{90}$-$T_{10}$ and $T_{50}$-$T_{10}$ of final blends). Aromatic content is not affected by the identity of the specific paraffinic hydrocarbons (e.g., those produced in the present oligomerization process) in the blend stock. Added SPK merely dilutes the aromatics present in a convention jet blendstock. Most conventional jet fuels have greater than 16% aromatic content. Accordingly, blends containing up to 50% synthetic blend stock, including the C12/C16 mixtures described herein, can be prepared. The blend may comprise up to 50% isobutanol-derived SPK blendstock (e.g., up to 1%, up to 5%, up to 10%, up to 15%, up to 20%, up to 25%, up to 30%, up to 35%, up to 40%, up to 45%, up to 50%, or any other value or range of values therein or therebelow, for example about 1%, about 5%, about 10%, about 15%, about 20%, about 25%, about 30%; about 35%, about 40%, about 45%, or about 50% isobutanol-derived SPK blendstock, including any range or subrange between these values).

The ASTM D7566-10a $T_{90}$-$T_{10}$ requirement for SPK blendstock specifies that the temperature difference between the point where 10% of the volume of the SPK blendstock boils and 90% of the volume of the SPK blendstock boils is greater than 22° C. In general, SPK blendstocks with larger $T_{90}$-$T_{10}$ differences can be blended in more types of conventional jet fuels to meet the blend requirements of ASTM D7566-10a. For example, FIG. 7 shows several distillation curves of various blends of conventional jet and the SPK C12/C16 blends of FIG. 5. As shown, conventional jet which initially falls outside the D7566-10a specification can be modified with varying blends of the C12/C16 mixtures of FIG. 6. At a 50% blend of SPK and conventional jet, wherein the SPK contains a 50/50 mix of C12/C16 oligomers, an out of specification fuel is brought into specification. Thus, as shown in FIG. 7, increasing the C16 content of a jet blend containing SPK increases $T_{90}$-$T_{10}$ of the resultant blend, and can "tune" the resultant blend properties to meet the specification.

The $T_{90}$-$T_{10}$ and $T_{50}$-$T_{10}$ requirements of final blends are dictated by a combination of properties from both the SPK blend stock and the conventional jet fuel that is blended will the SPK. In general, jet fuels with stricter freeze point requirements, such as Jet A-1 and JP-8, have narrower boiling point range specifications. Thus, when most SPK jet blendstocks, which generally contain a distribution paraffinic hydrocarbons, are blended with the relatively narrow boiling point range conventional fuels such as Jet A-1 or JP-8, the $T_{90}$-$T_{10}$ and $T_{50}$-$T_{10}$ requirements for the resulting blends may not be met even if $T_{90}$-$T_{10}$ SPK blendstock requirements are met. However, conventional jet fuels with wider boiling ranges, like Jet A, can usually be blended with SPK blendstocks that meet the $T_{90}$-$T_{10}$ blend stock requirements. Appropriate SPK blendstocks with a specific distribution of C12 to C16 oligomers may be selected for blending with tighter boiling range fuels to yield an SPK-conventional blend that meets the specifications for that particular grade of fuel.

Figure 8:
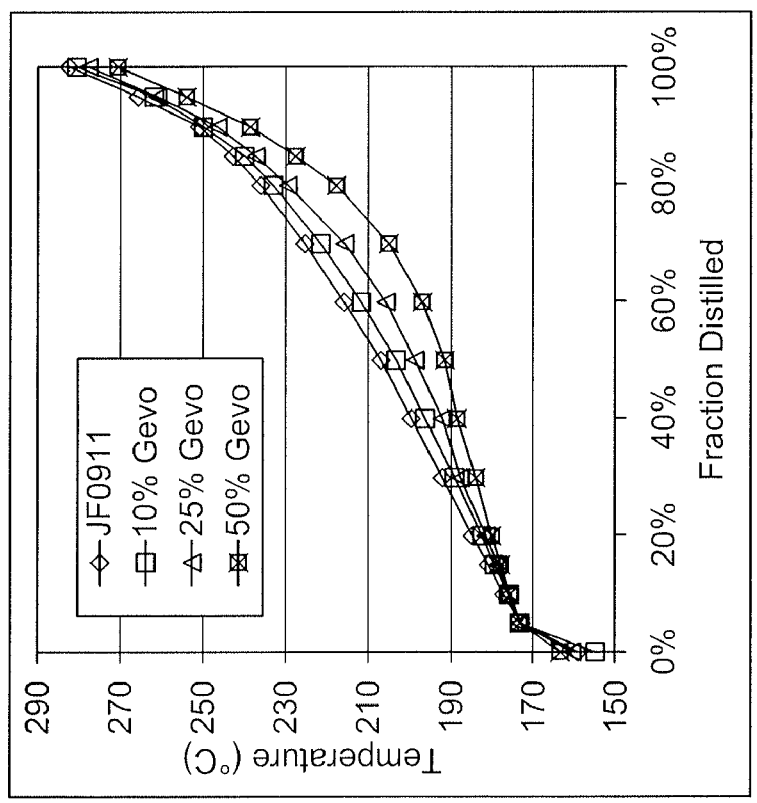
FIG. 8 is a diagram showing distillation curves for exemplary SPK/conventional jet blends which meet the ASTM D7566-10a specification.

For example, as shown in FIG. 8, a narrow boiling point conventional jet fuel is blended with 50% of various C12/C16 mixtures to show the effect of $T_{90}$-$T_{10}$ and $T_{50}$-$T_{10}$ on the final blend. All blends of 90/10 C12/C16 SPK blendstock produced as described herein blended with conventional fuel shown in FIG. 8 meet the ASTM D7566-10a specification. Increasing C16 content in the blend stock increases the $T_{90}$-$T_{10}$ value of the blend stock as described above. Furthermore, when C16 content is higher, it is possible to blend with narrow boiling point conventional jet fuel that has a $T_{90}$-$T_{10}$ and $T_{50}$-$T_{10}$ below the blend specification and bring the resulting blend into the blend specification. This is a feature of the bimodal distribution of the C12/C16 mixture described herein, namely, as C16 content in the SPK increases, $T_{90}$ increases, a feature that is atypical for most SPK jet blendstocks. Optimal C12/C16 content for blending with wide boiling conventional jet fuel (e.g., Jet A) is from about 70/30 to about 50/50. For blending with narrow boiling conventional jet fuels (e.g., Jet A-1 and JP-8) about 60/40 to about 50/50 blends are preferred. However, as described herein, the relative ratios of C12 to C16 components in the SPK, and relative amounts of SPK and jet may be selected such that the final blend meets or exceeds the standards of ASTM D7566-10a.

The present disclosure will now be further illustrated with reference to the following, non-limiting examples.

EXAMPLES

Three surrogate blends were prepared using mixtures of 2,2,4,6,6 pentamethylheptane (C12) and 2,2,4,6,6,8,8 heptamethylnonane (C16). The mixtures were prepared at ratios of 90% C12/10% C16, 70%/30%, and 50%/50%. These ratios were chosen to simulate a wide range of possible compositions of the present renewable SPK jet blendstocks. The distillation curves for the three surrogate fuels are shown in FIG. 6. Also shown in FIG. 6 is an exemplary jet fuel comprising SPK with an approximate composition of 90% C12/10% C16 labeled 'AF Tier II'. While the SPK blendstock employed comprised more than just C12 and C16 components, the 90/10 surrogate provides a representative example of such a blend.

A narrow boiling Jet A-1 petroleum-derived base fuel was chosen for blending with the SPK to demonstrate blending for the extreme case, wherein the boiling point range of the conventional jet fuel has relatively high sensitivity to added SPK it should be noted that this base jet fuel alone does not meet the distillation slope requirements of T50-T10>22° C. for a semi-synthetic jet fuel blend as specified by ASTM D7566 10a. The three surrogate mixtures were blended at 50% conventional Jet A-1 with 50% of the surrogate mixture. FIG. 7 shows the resulting distillation curves and the impact on distillation slope requirements (measured by D86). For this particular base fuel, all three surrogate compositions result in a fuel that meets the T90-T10 distillation slope requirements ASTM D7566 10a. However, only the 50/50 surrogate results in a final blend that meets the T50-T10 distillation curve requirements of ASTM D7566 10a.

The embodiments described herein and illustrated by the foregoing examples should be understood to be illustrative of the present invention, and should not be construed as limiting. On the contrary, the present disclosure embraces alternatives and equivalents thereof, as embodied by the appended claims.

What is claimed is:

1. A process for preparing renewable jet fuel blendstock comprising:
   (a) treating biomass to form a feedstock;
   (b) fermenting the feedstock with one or more species of microorganism, thereby forming isobutanol;
   (c) dehydrating at least a portion of the isobutanol obtained in step (b), thereby forming a dehydration product comprising isobutene;
   (d) oligomerizing at least a portion of the dehydration product, thereby forming a product comprising one or more $C_8$, one or more $C_{12}$, and one or more $C_{16}$ unsaturated oligomers; and
   (e) hydrogenating at least a portion of the product of step (d) in the presence of hydrogen, thereby forming a renewable jet fuel blendstock comprising one or more $C_{12}$ and one or more $C_{16}$ saturated alkanes;
   (f) adjusting the ratio of $C_{12}$ and $C_{16}$ saturated alkanes provided by step (e) to form a renewable jet fuel blendstock which meets or exceeds the requirements of ASTM D7566-10a for hydroprocessed synthesized paraffinic kerosene (SPK).

2. The process of claim 1, wherein said dehydrating is carried out in the presence of a dehydration catalyst, said oligomerizing is carried out in the presence of an oligomerization catalyst, and said hydrogenating is carried out in the presence of a hydrogenation catalyst.

3. The process of claim 2, wherein each of said dehydrating, oligomerizing, and hydrogenating are carried out in a different reaction zone.

4. The process of claim 2, wherein two or more of said dehydrating, oligomerizing, and hydrogenating are carried out in the same reaction zone.

5. The process of claim 2, wherein one or more of the dehydration catalyst, oligomerization catalyst, or hydrogenation catalyst are heterogeneous catalysts.

6. The process of claim 2, wherein one or more of the dehydration catalyst, oligomerization catalyst, or hydrogenation catalyst are homogeneous catalysts.

7. The process of claim 1, wherein said dehydrating and/or said oligomerizing are carried out in the presence of an acidic catalyst, wherein the acidic catalyst for dehydrating and the acidic catalyst for oligomerizing is the same or different.

8. The process of claim 7, wherein said acidic catalyst for dehydrating and said acidic catalyst for oligomerizing are each independently selected from the group consisting of inorganic acids, organic sulfonic acids, heteropolyacids, perfluoroalkyl sulfonic acids, metal salts thereof, mixtures of metal salts, and combinations thereof.

9. The process of claim 8, wherein said acid catalyst for oligomerizing is Amberlyst-35.

10. The process of claim 1, wherein said hydrogenating is carried out in the presence of a hydrogenation catalyst selected from the group consisting of iridium, platinum, palladium, rhodium, nickel, ruthenium, rhenium and cobalt; compounds thereof; and combinations thereof.

11. The process of claim 1, further comprising removing said isobutanol from the feedstock before said dehydrating.

12. The process of claim 11, wherein said removing comprises carrying out said fermenting in step (b) below atmospheric pressure, whereby aqueous isobutanol vapor is removed.

13. The process of claim 1, further comprising:
  a. separating at least a portion of said product comprising one or more $C_{12}$ and one or more $C_{16}$ unsaturated oligomers produced in step (d); and
  b. combining the separated portion with the dehydration product of step (c) prior to said oligomerization step
  c. adjusting the ratio of $C_{12}$ and $C_{16}$ saturated alkanes provided by step (e) by recycling at least a portion of the $C_8$ unsaturated oligomers formed in step (d) back to the oligomerization step, thereby increasing the amount of $C_{16}$ unsaturated oligomers.

14. A process for preparing a renewable jet fuel comprising combining a renewable jet fuel blendstock prepared according to the method of claim 1 with a conventional jet fuel blendstock, whereby said renewable jet fuel meets or exceeds the requirements of ASTM D7566-10a.

15. The process of claim 14, further comprising combining said renewable jet fuel blendstock and said conventional jet fuel blendstock with one or more $C_{10}$-$C_{14}$ aromatic hydrocarbons.

* * * * *